US008863655B2

(12) United States Patent
Trovinger

(10) Patent No.: US 8,863,655 B2
(45) Date of Patent: Oct. 21, 2014

(54) JUICER WITH ALTERNATE CUTTERS

(71) Applicant: Russell T. Trovinger, Lafayette, CA (US)

(72) Inventor: Russell T. Trovinger, Lafayette, CA (US)

( * ) Notice: Subject to any disclaimer, the term of this patent is extended or adjusted under 35 U.S.C. 154(b) by 0 days.

(21) Appl. No.: 13/932,901

(22) Filed: Jul. 1, 2013

(65) Prior Publication Data

US 2013/0284032 A1 Oct. 31, 2013

Related U.S. Application Data

(62) Division of application No. 11/899,649, filed on Sep. 6, 2007, now Pat. No. 8,474,374.

(51) Int. Cl.
*A23N 1/02* (2006.01)

(52) U.S. Cl.
CPC .......................................... *A23N 1/02* (2013.01)
USPC .............. 99/503; 99/510; 99/504; 241/260.1

(58) Field of Classification Search
CPC ......................................................... A23N 1/02
USPC ............ 99/348, 470, 483, 492; 100/117, 145, 100/147, 148; 426/481.486, 489, 518, 616; 366/205, 306; 241/92, 93, 260.1, 241/282.1, 169.1; 210/173, 174
See application file for complete search history.

(56) References Cited

U.S. PATENT DOCUMENTS

| | | | | |
|---|---|---|---|---|
| 3,548,280 A | * | 12/1970 | Cockroft | 318/443 |
| 5,381,730 A | * | 1/1995 | Kim | 99/510 |
| 5,452,650 A | * | 9/1995 | Lee | 99/510 |
| 5,806,413 A | * | 9/1998 | Trovinger | 99/492 |
| 5,906,154 A | * | 5/1999 | Yoon et al. | 99/510 |
| 6,363,837 B1 | * | 4/2002 | Sham et al. | 99/348 |
| 6,394,377 B1 | * | 5/2002 | Kim et al. | 241/260.1 |
| 2003/0147723 A1 | * | 8/2003 | Schwab | 411/526 |
| 2007/0277682 A1 | * | 12/2007 | Wong | 99/495 |

* cited by examiner

*Primary Examiner* — Jianying Atkisson
(74) *Attorney, Agent, or Firm* — Denise A. DeBoo; Audrey A. Millemann; Weintraub Tobin, et al.

(57) ABSTRACT

A juicer device comprised of a motor disposed within a housing and having an output shaft projecting away from the housing; at least two alternate cutters each individually detachably connectable to the output shaft; a plurality of alternate inserts wherein a selected one of the plurality of alternate inserts circumscribes a selected one of the at least two alternate cutters detachably connected to the output shaft; and a body circumscribing the selected one of the plurality of alternate inserts wherein the body and the selected one of the plurality of alternate inserts include openings for feeding food to the selected one of the at least two alternate cutters detachably connected to the output shaft and openings for receiving juice, homogenized food, or shredded food therefrom upon actuation of the motor under the control of a safety system.

10 Claims, 16 Drawing Sheets

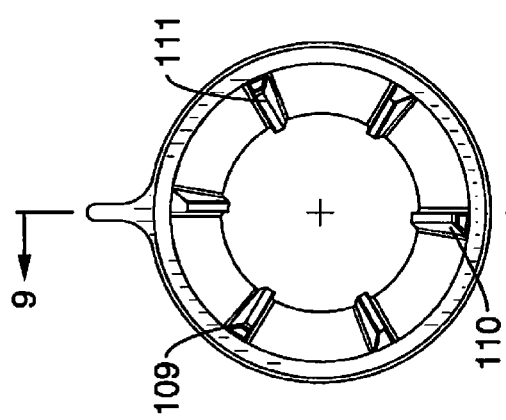
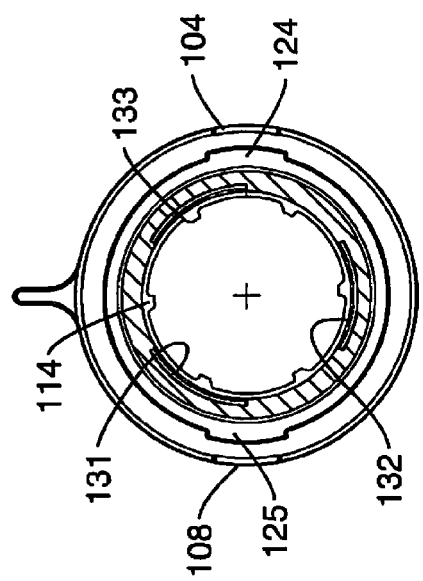
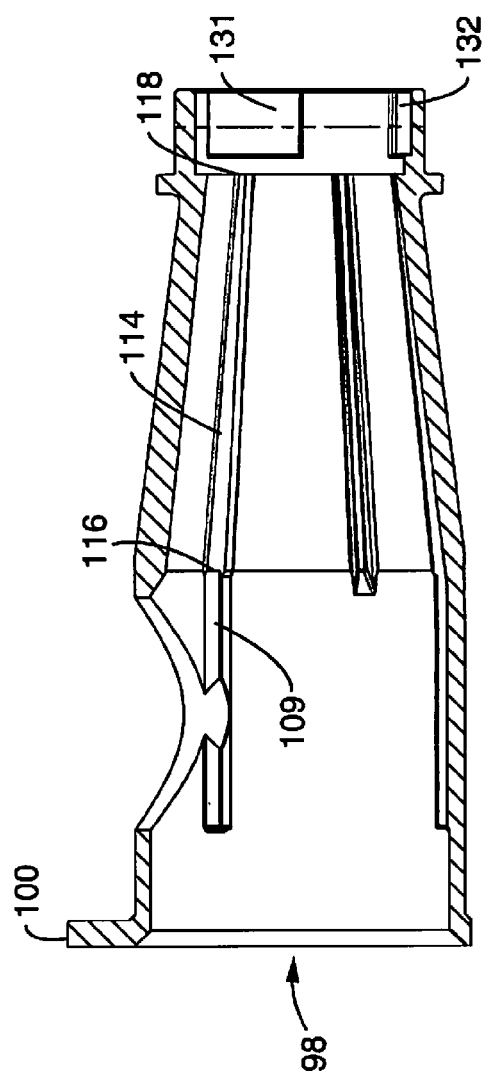

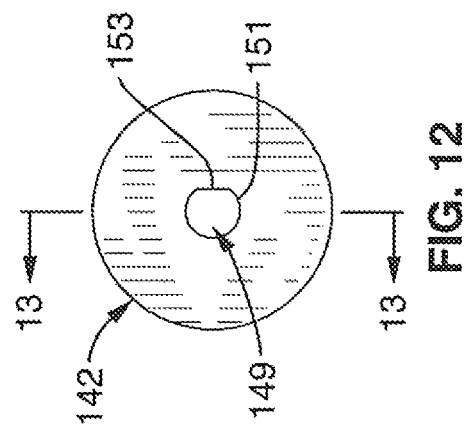
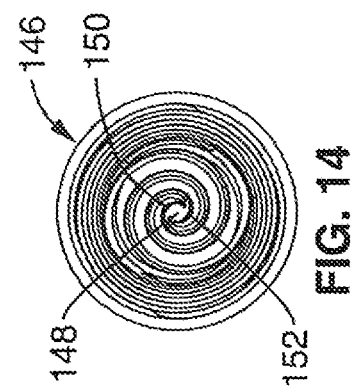
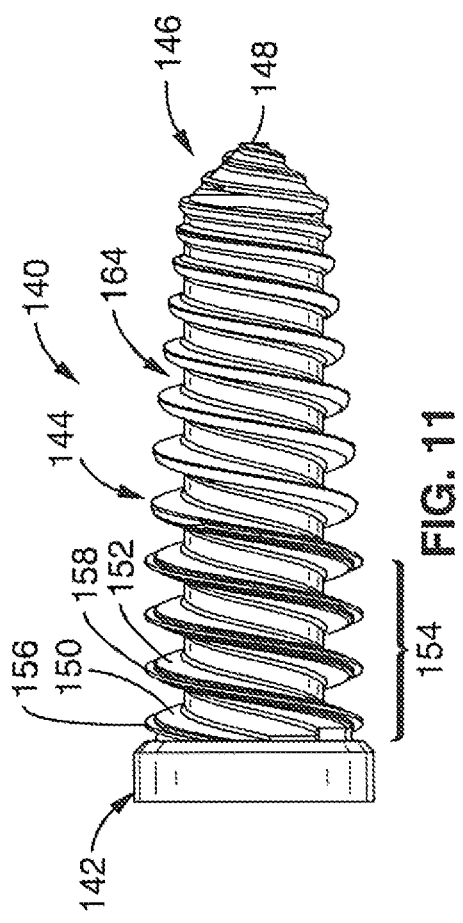
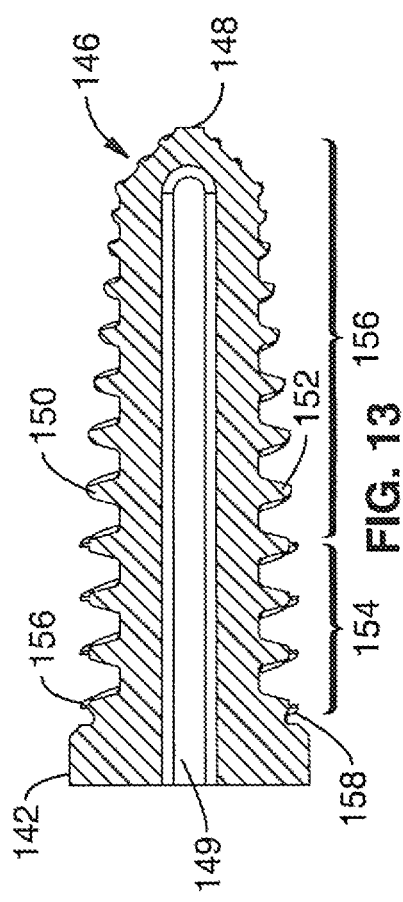

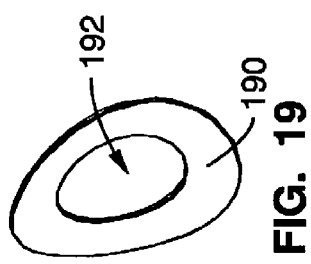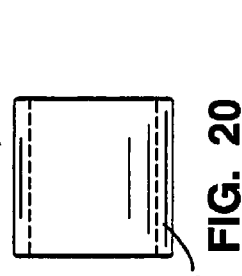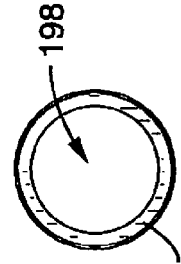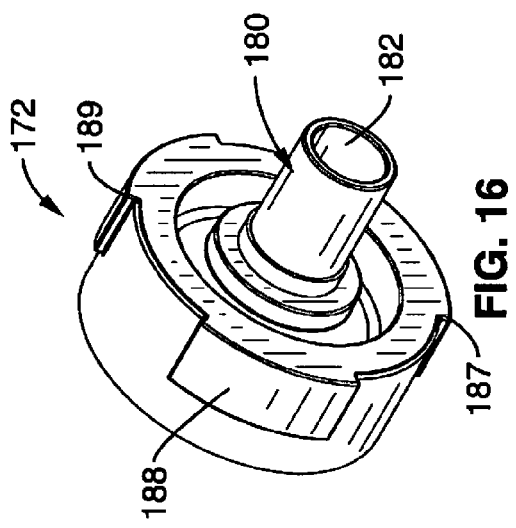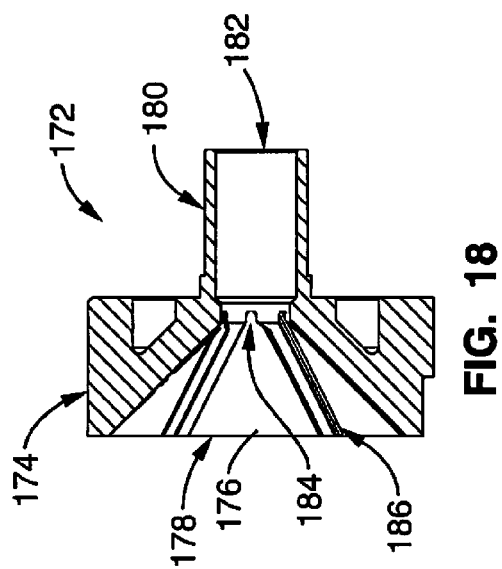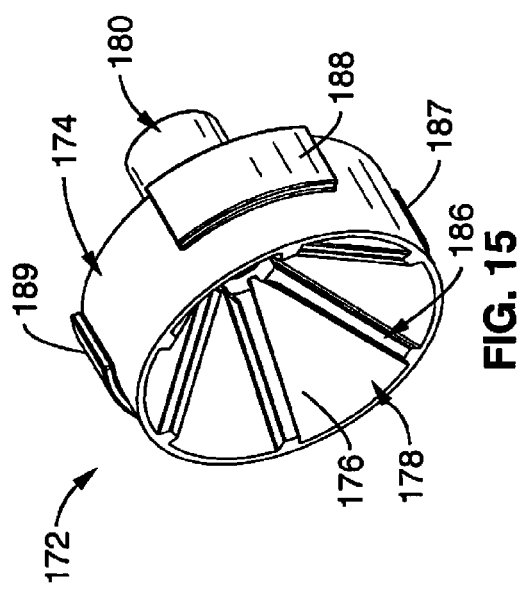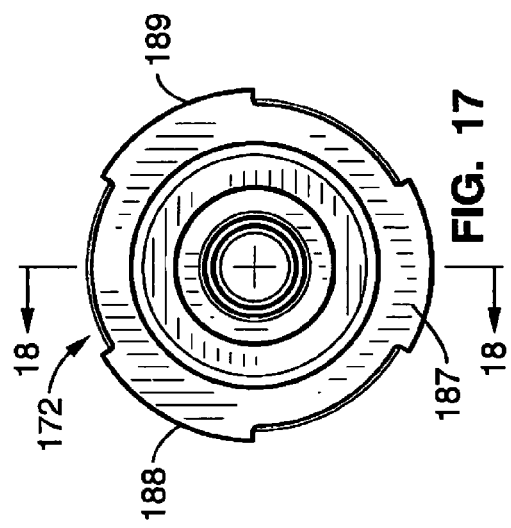

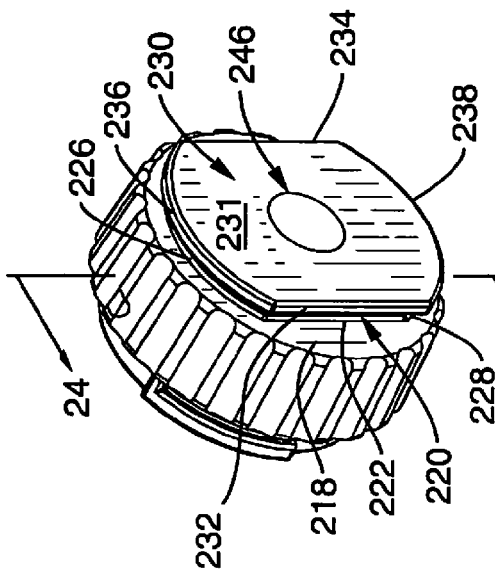
FIG. 23
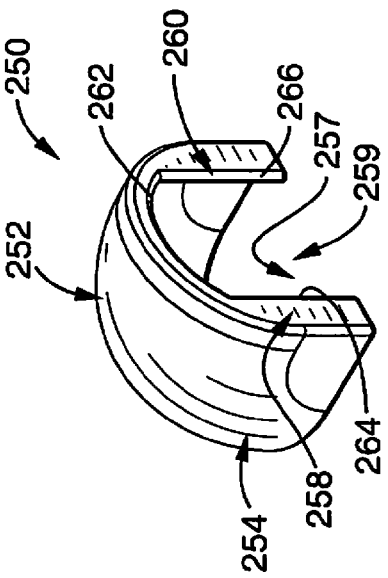
FIG. 26
FIG. 25
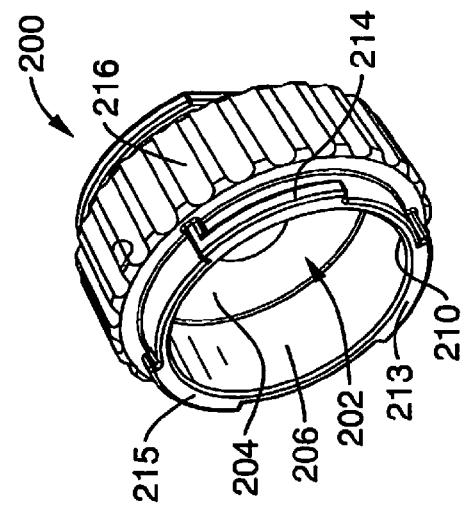
FIG. 22
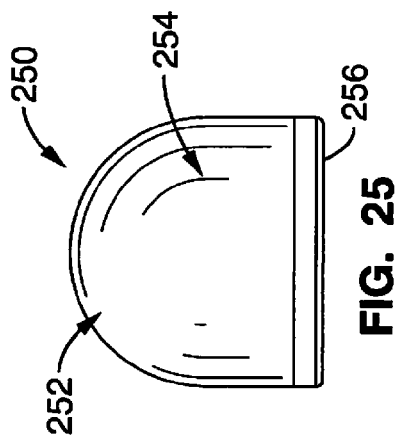
FIG. 24

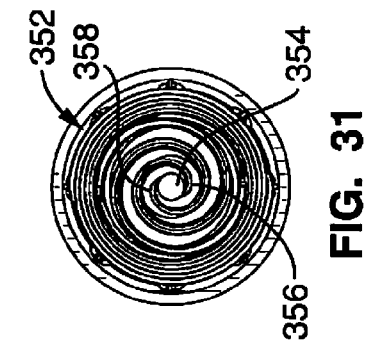
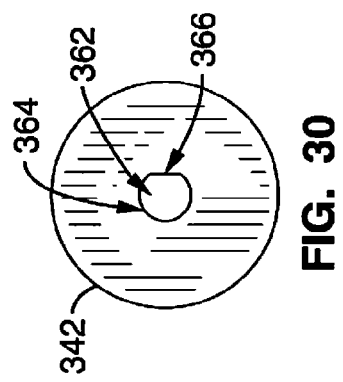
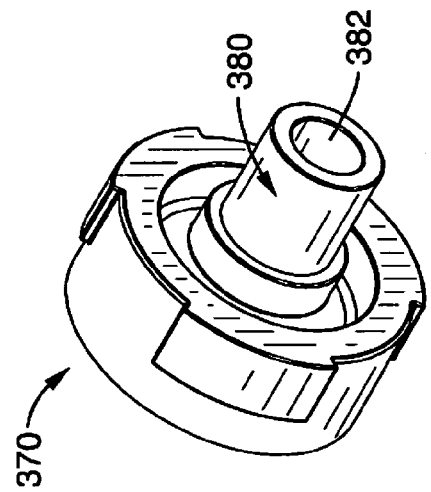
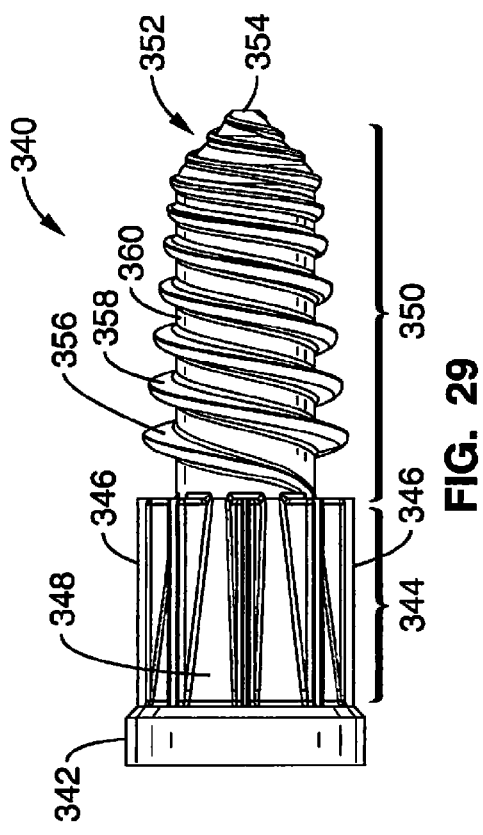
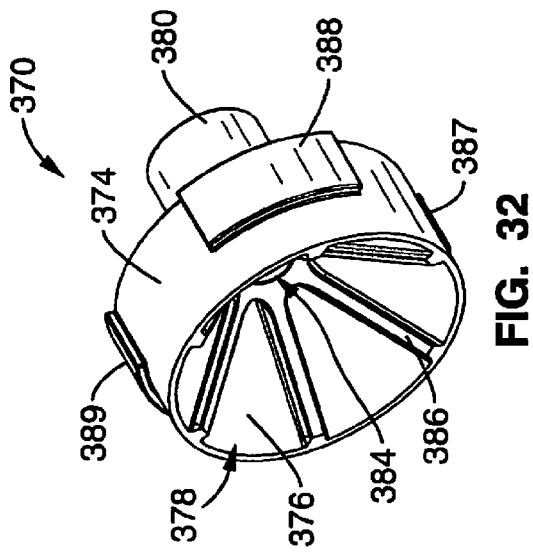

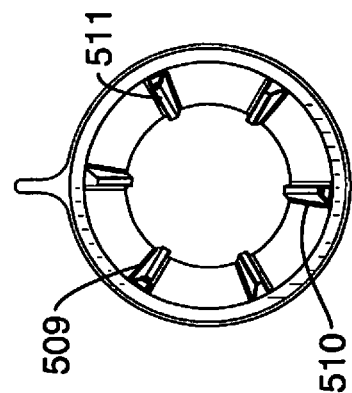
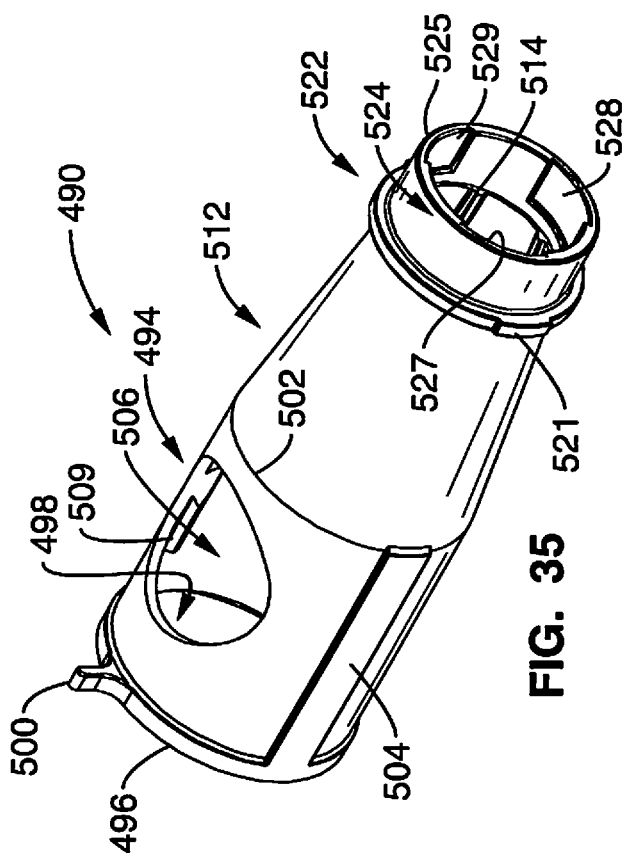
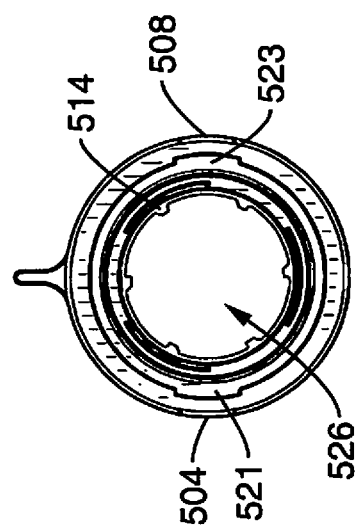

JUICER WITH ALTERNATE CUTTERS

CROSS-REFERENCE TO RELATED APPLICATIONS

This application is a divisional application of, and claims the benefit of priority under 35 U.S.C, §§120 and 121 to, U.S. application Ser. No. 11/899,649, filed Sep. 6, 2007, currently pending, and which is hereby incorporated by reference herein in its entirety.

FIELD OF THE INVENTION

This invention relates generally to devices used to process vegetables and fruit and, in particular, to an electric vegetable and fruit juicer that has two alternate cutters that permit continuous juicing of wheatgrass and other soft greens, hard and soft vegetables, and fruit, as well as homogenizing and shredding.

BACKGROUND OF THE INVENTION

There are several different juicers currently available for the extraction of juice from vegetables or fruit. These devices are generally powered by an electric motor and employ filters to remove excess solids from the juice. Some allow for continuous juicing (automatic solids expulsion), while some do not and must be occasionally shut down for manual removal of accumulated solids.

There are two primary types of juicers: auger and masticating. The auger juicers typically operate at very low speeds, about 80-100 rpm. The auger tears or slices and then crushes the food during processing. Examples are described in U.S. Pat. No. 6,637,323 issued Oct. 28, 2003, to Kim; U.S. Pat. No. 6,394,377 issued May 28, 2002, to Kim, et al.; U.S. Pat. No. 5,906,154 issued May 25, 1999 to Yoon, et al.; U.S. Pat. No. 4,429,626 issued Feb. 7, 1984 to Ihara, et al.; and U.S. Pat. No. 4,385,553 issued May 31, 1983 to Ihara, et al. Some auger juicers utilize two augers at the same time. See U.S. Pat. No. 5,452,650 issued Sep. 26, 1995, to Lee and U.S. Pat. No. 5,381,730 issued Jan. 17, 1995, to Kim. These juicers are best suited for soft materials and greens. Because they rotate at a relatively low speed, they are cumbersome when juicing hard materials, such as carrots and beets. For some processes, such as homogenizing, these juicers are inadequate.

The masticating juicers typically operate at higher speeds than the auger juicers and use a cutter that grinds and chews the food. Centrifugal juicers, a type of masticating juicer, have a rotating, horizontal grating disk, and operate at about 3600 rpm. U.S. Pat. No. 4,643,085 issued Feb. 17, 1987 to Bertocchi and U.S. Pat. No. 6,050,180 issued Apr. 18, 2000 to Moline describe examples of centrifugal juicers. Centrifugal juicers are best suited for juicing of vegetables and fruit. They cannot juice greens such as wheatgrass, mix, shred, or homogenize food to make sorbets, nut butters, soups, and other similar food products.

Another type of masticating juicer, the CHAMPION juicer (see U.S. Pat. No. 2,864,419 issued Dec. 16, 1958 to Woock; U.S. Pat. No. 3,976,001 issued Aug. 24, 1976 to Trovinger; and U.S. Pat. No. 5,806,413 issued Sep. 15, 1998 to Trovinger has a single cutter that has saw tooth blades at one end and an auger at the other end, which rotates at about 1,725 rpm. First, the blade part of the cutter grinds the food to be processed, to separate the juice from the solids. Next, a combination of centrifugal force, compression, and gravity are used to expel the juice out the bottom of the housing. Then, the auger part of the cutter forces the solids forward and out the front of the housing. This juicer does not effectively juice greens for two reasons: first, wheatgrass wraps and collects around the cutter blades, and, second, solids compression is not sufficient for efficient extraction of juice.

Thus, there is a need for a single juicer that overcomes the significant shortcomings of the known prior-art as delineated hereinabove.

BRIEF SUMMARY OF THE INVENTION

Accordingly, and in one aspect, an embodiment of the invention provides a juicer that can easily, quickly, and efficiently juice both soft materials, like greens, and hard materials, like vegetables, as well as fruit. Additionally, an embodiment of the invention provides a juicer that has more than one speed, so that the processing of all materials is effectively optimized. Furthermore, an embodiment of the invention provides a juicer that performs a variety of processes in addition to juicing, such as shredding and homogenizing, to allow the preparation of sorbets, soups, nut butters, and other foods.

In particular, an embodiment of the invention provides an all-purpose juicer that has two removable, alternate cutters: a greens cutter and a grinding cutter. The greens cutter is used for the juicing of wheatgrass and greens, soft vegetables, and fruits, and for coarse shredding. This cutter utilizes a smooth, sharp-edged spiral cutting portion to chop the food into small pieces and an auger portion to move the chopped food forward. The grinding cutter is used for hard vegetable juicing, homogenizing, and fine shredding. This cutter utilizes a saw toothed cutting portion to grind the food into small pieces and an auger portion to move the ground food forward. Both the greens cutter and the grinding cutter have a spiral auger nose which promotes total self-expulsion of food solids during juicing to minimize heat build-up in the juice. This permits a cutter speed for wheatgrass juicing that is over four times higher, and for hard vegetable juicing that is over twenty times higher, than the speeds of existing single and dual auger juicers, resulting in a much quicker juicing process.

Furthermore, and in one embodiment, the juicer includes a body; a set of three removable, alternate cylindrical body inserts for juicing, homogenizing, or shredding that slide into the body; two alternate restrictors; a restrictor nut and a shredder nut; an optional deflector; an electric motor with a motor shaft; and a safety system for safely energizing the electric motor; and a tamper to assists in forcing foods to the cutter.

Hence, in one aspect, an embodiment of the invention provides a juicer that is advantageous in that it can be used for juicing soft materials, including greens and soft vegetables, and for juicing hard materials, such as hard vegetables, in addition to fruit, in a fast and efficient manner. In another aspect, an embodiment of the invention provides a juicer that is advantageous in that it has multiple speeds, which permit the optimization of all processes. In yet another aspect, an embodiment of the invention provides a juicer that is advantageous in that, in addition to juicing, it can be used for a variety of different processes, including homogenizing, mixing, and coarse or fine shredding, so that sorbets, soups, nut butters, and other similar foods can be prepared. In a further aspect, an embodiment of the invention provides a juicer that is advantageous in that it is more efficient than existing juicers and produces an increased amount of juice.

Accordingly, it should be apparent that numerous modifications and adaptations may be resorted to without departing from the scope and fair meaning of the claims as set forth hereinbelow following the detailed description of the invention.

BRIEF DESCRIPTION OF THE DRAWINGS

FIG. 8A is a front plan view of the insert member shown in FIG. 7.

FIG. 8B is a back plan view of the insert member shown in FIG. 7.

FIG. 9 is a sectional view of the insert member shown in FIG. 7. taken along line 9-9 of FIG. 8B.

FIG. 10 is a side plan view of a screen cone of a screen insert of the juicer.

FIG. 11 is a side plan view of a greens cutter of the juicer.

FIG. 12 is a rear plan view of the greens cutter of the juicer.

FIG. 13 is a sectional view of the greens cutter taken along line 13-13 of FIG. 12.

FIG. 14 is a front plan view of the greens cutter of the juicer.

FIG. 15 is a rear and side perspective view of a greens restrictor body of a greens restrictor of the juicer.

FIG. 16 is a side and front perspective view of the greens restrictor body of the greens restrictor of the juicer.

FIG. 17 is a front plan view of the greens restrictor body of the greens restrictor of the juicer.

FIG. 18 is a sectional view of the greens restrictor body taken along line 18-18 of FIG. 17.

FIG. 19 is a front perspective view of a wave disc spring of the greens restrictor of the juicer.

FIG. 20 is a side plan view of a spring retainer of the greens restrictor of the juicer.

FIG. 21 is a front plan view of the spring retainer of the greens restrictor of the juicer.

FIG. 22 is a rear and side perspective view of a restrictor nut of the juicer.

FIG. 23 is a side and front perspective view of the restrictor nut shown in FIG. 22.

FIG. 24 is a sectional view of the restrictor nut taken along line 24-24 of FIG. 23.

FIG. 25 is a front plan view of a deflector of the juicer.

FIG. 26 is a side and rear perspective view of the deflector of the juicer.

FIG. 29 is a side plan view of a grinding cutter of the juicer.

FIG. 30 is a rear plan view of the grinding cutter of the juicer.

FIG. 31 is a front plan view of the grinding cutter of the juicer.

FIG. 32 is a rear and side perspective view of a vegetable restrictor of the juicer.

FIG. 33 is a side and front perspective view of the vegetable restrictor of the juicer.

FIG. 35 is a side and front perspective view of a homogenizing insert of the juicer.

FIG. 36A is a front plan view of the homogenizing insert of the juicer.

FIG. 36B is a back plan view of the homogenizing insert of the juicer.

DETAILED DESCRIPTION OF THE INVENTION

Figure 1:
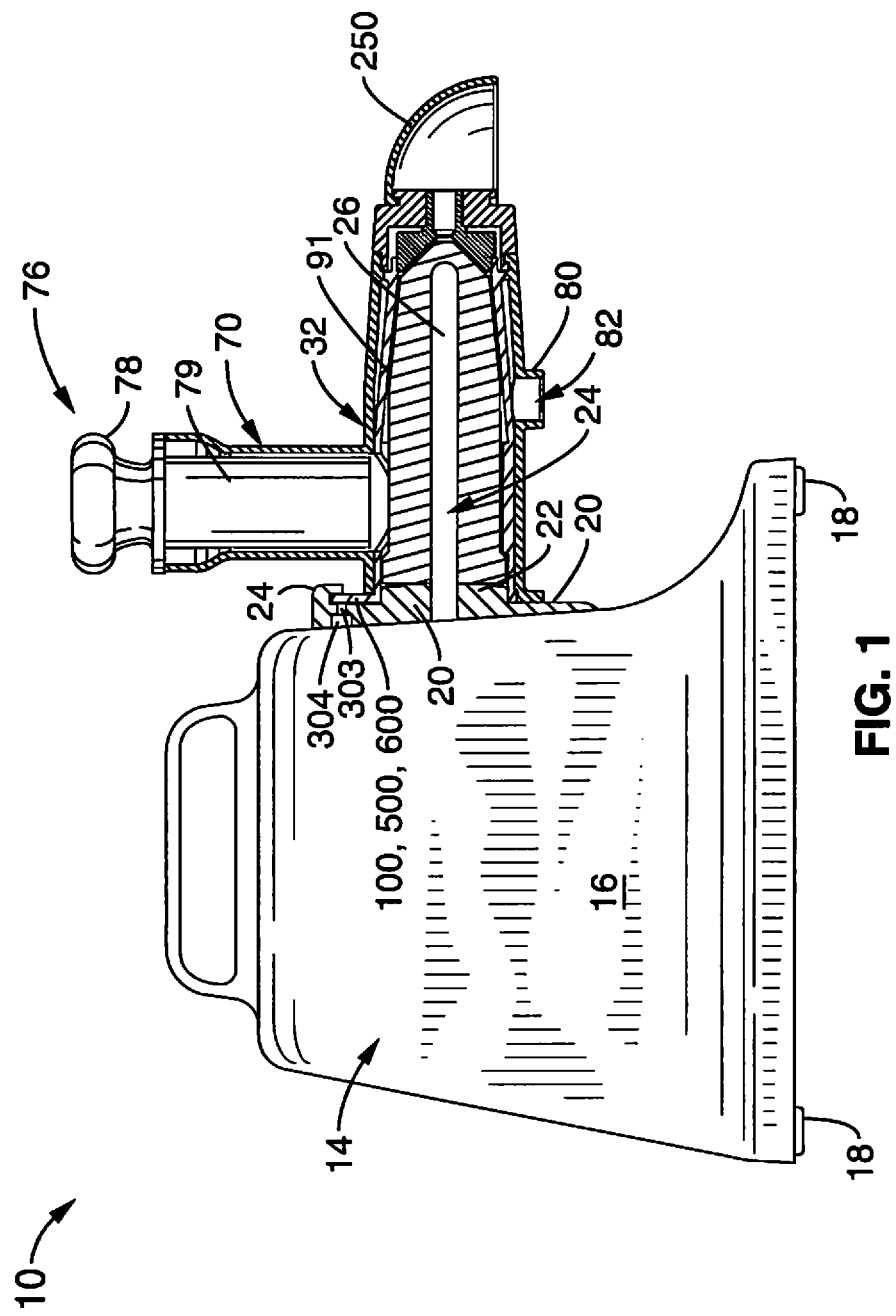
FIG. 1 is a side elevation view of an embodiment of a juicer with portions taken in section for clarity.

Considering the drawings, wherein like reference numerals denote like parts throughout the various drawing figures, reference numeral 10 is directed to a juicer according to an embodiment of the present invention.

Referring to FIG. 1, and in one embodiment, the juicer 10 is comprised of a horizontally disposed electrical motor 12 enclosed within a housing 14 which includes a base 16 supported on a surface via feet 18. The housing 14 is provided with a hub 20 that includes a shaft seal 22 to prevent contaminants escaping from or entering into electrical motor 12 from the external environment. A circular motor shaft 24 having a flat side 26 is driven by the electrical motor 12 and generally horizontally extends from motor 12, through both the hub 20 and shaft seal 22. In one embodiment, the motor shaft 24 is about three and one-half inches long and about one-half inch in diameter and protrudes about two inches beyond the face of hub 20.

The circular motor shaft 24 receives one of a plurality of different cutters 140 or 340 associated with one of a plurality of different configurations of components that allow the juicer 10 to be used for different purposes. In one embodiment, the motor shaft 24 has a machined flat about 0.05 inches in depth and about 1.9 inches in length as measured back from the tip, which corresponds to a blind bore disposed in each of the cutters 140, 340 for preventing slippage between cutters 140, 340 and motor shaft 24 as will be further delineated hereinbelow.

More specifically, and in one embodiment, the juicer 10 has four main different configurations of components: a greens juicing configuration 30, a vegetable juicing configuration 330, a homogenizing configuration 430, and a shredder configuration 530 for allowing the juicer 10 to be used for different purposes. The user can switch from one configuration to another by using a different arrangement of components and the components may be grouped differently by the user to create an alternative configuration that may serve a particular purpose.

Greens Juicing Configuration 30

Figure 2:
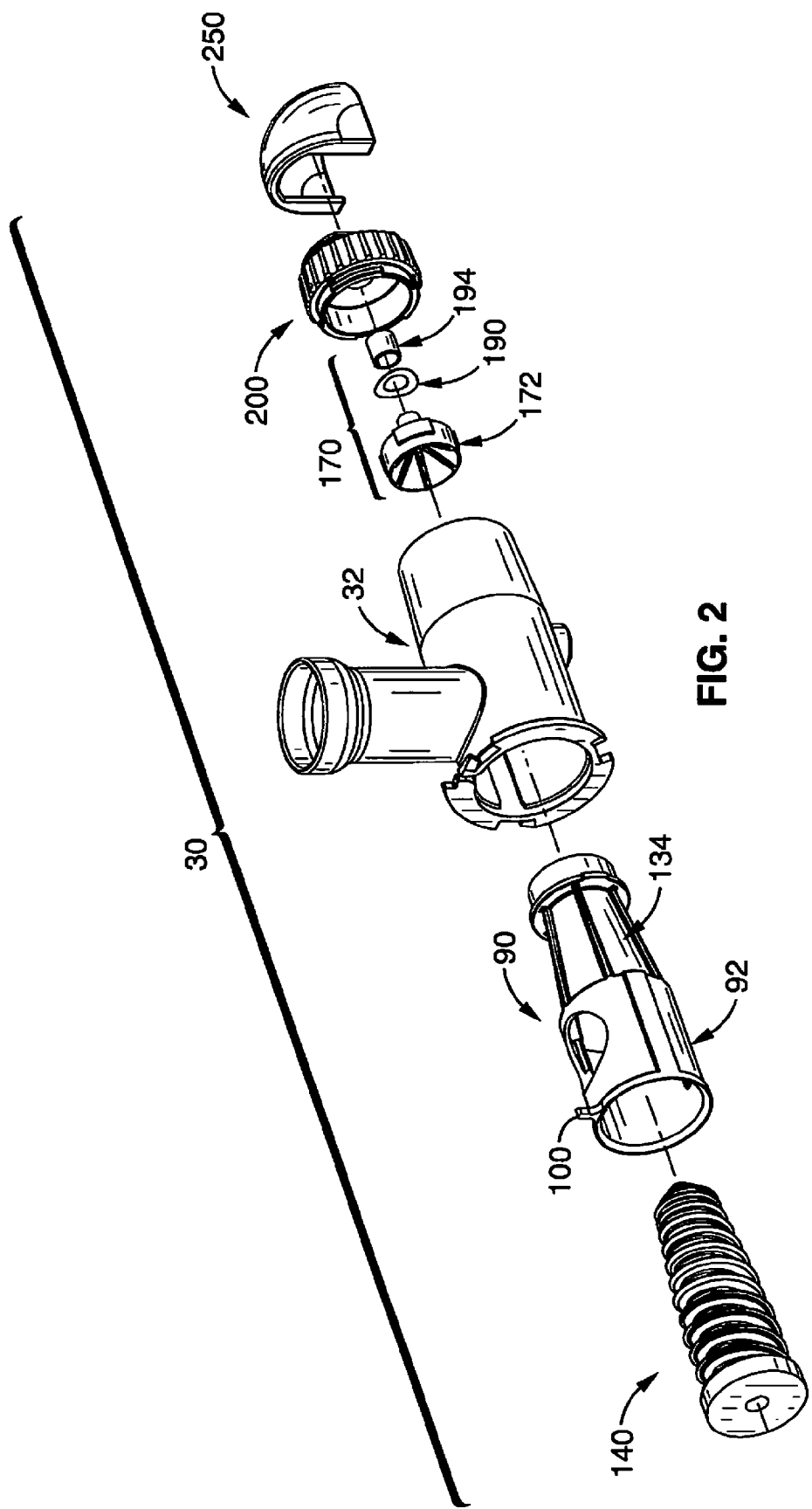
FIG. 2 is an exploded parts perspective view of a greens juicing configuration of the juicer.
Figure 5:
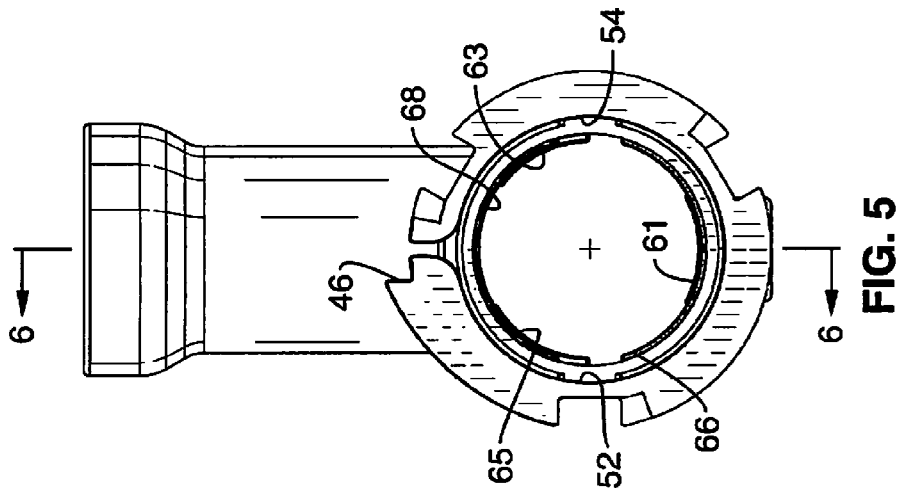
FIG. 5 is a rear plan view of the main body of the juicer.
Figure 3:
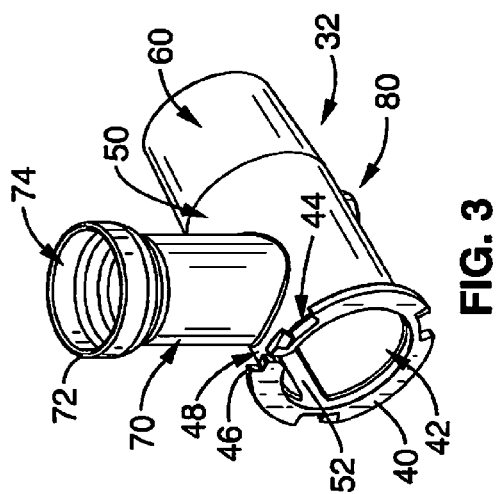
FIG. 3 is a back and side perspective view of a main body of the juicer.
Figure 4:
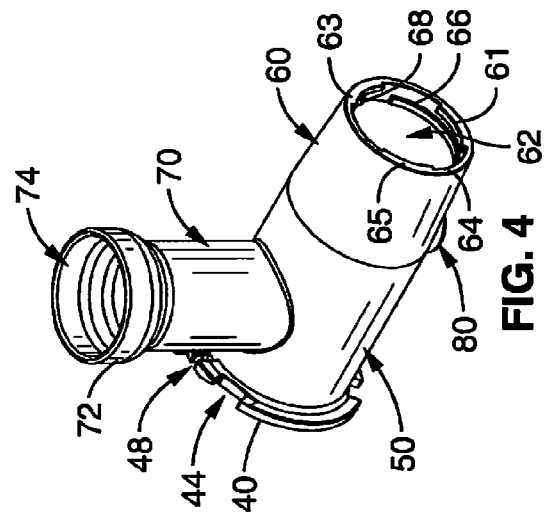
FIG. 4 is a front and side perspective view of the main body of the juicer.

FIG. 2 shows an exploded parts perspective view of the greens juicing configuration 30 of the juicer 10 for preferably juicing greens, such as wheatgrass or leafy materials, or for juicing fruits and soft vegetables. The greens juicing configuration 30 includes a main or juicer body 32 having an open back end 42 and an open front end 62, a screen insert 90 received through the open back end 42 of the main body 32 and extending through the open front end 62 thereof and having an open inner end 98 and an open outer end 130. The greens juicing configuration 30 further includes a greens cutter 140 having a rear keyed bore 149 received on the motor shaft 24 of the electrical motor 12. The greens cutter 140 is circumscribed by the screen insert 90 received within the main body 32 when the main body 32 is connected to hub 22. The greens juicing configuration 30 further includes a greens restrictor 170 received within the open outer end 130 of the screen insert 90 and a restrictor nut 200 receiving the greens restrictor 170 and coupling to the open front end 62 of main body 32. An optional deflector 250 operatively couples to restrictor nut 200.

Main Body 32

Figure 6:
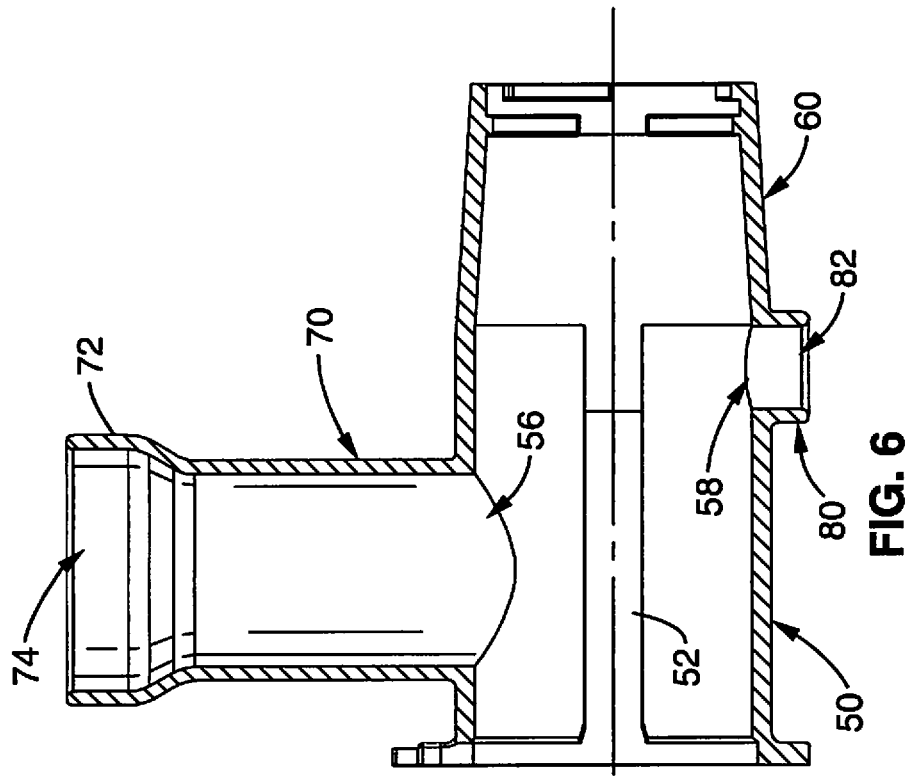
FIG. 6 is a sectional view of the main body of the juicer taken along line 6-6 of FIG. 5.

Referring to FIGS. 3 through 6, and in one embodiment, the main body 32 includes a rear annular flange 40 that defines an open back end 42 of the main body 32, a hollow cylindrical portion 50 integrally formed with and horizontally extending from the rear annular flange 40, and a hollow conical portion 60 integrally formed with and horizontally extending from the hollow cylindrical portion 50 and terminating to an open front end 62 of the main body 32. Additionally, the main body 32 includes an upwardly extending hollow feeding tube 70 and a downwardly extending abbreviated or short hollow outlet tube 80 both integrally formed with and in open communication with the hollow cylindrical portion 50. As shown in FIG. 6, the bottom surfaces of the hollow cylindrical portion 50 and the hollow conical portion 60 taper or funnel toward the downwardly extending abbreviated hollow outlet tube 80 to promote juice flow.

Rear Annular Flange 40

Rear annular flange 40 defines the open back end 42 of the main body 32 and includes a plurality of circumferentially spaced cut-out notches 44 for engaging over a plurality of circumferentially spaced in turned ears 24 integrally formed with hub 20. Additionally, the annular flange 40 includes a radially extending stop 46 for alignment engagement with the uppermost in turned ear of the plurality of in turned ears 24 (FIGS. 1 and 3) when the main body 32, with insert 90 received therein, is connected to the hub 20. Furthermore, the rear annular flange 40 includes an indentation 48 sized to receive a safety projection 100 on screen insert 90, safety projection 500 on homogenizing insert 490, and safety projection 600 on shredder insert 590 for engaging a microswitch push button 303 on a safety microswitch 304 as will be further delineated hereinbelow.

Hollow Cylindrical Portion 50

The hollow cylindrical portion 50 horizontally extends from the rear annular flange 40 and includes two interior diametrically opposed longitudinally extending channels 52, 54 that extend from the annular flange 40 to the hollow conical portion 60.

Hollow Conical Portion 60

The hollow conical portion 60 horizontally extends from the hollow cylindrical portion 50 to a circular front edge 64 defining the open front end 62 of the main body 32. The hollow conical portion 60 includes three inwardly projecting circumferentially spaced tabs 61, 63, and 65 extending from the interior surface of the hollow conical portion 60 immediately adjacent circular front edge 64 thereby defining three circumferentially spaced notches therebetween. Slightly further rearward from front edge 64, hollow conical portion 60 includes two partially circumferential ribs 66, 68 which define two diametrically opposed spacings therebetween.

In one embodiment, the open front end 62 of the main body 32 is slightly smaller in diameter than the open back end 42 of the main body 32. Additionally, the inside diameter of horizontally extending hollow cylindrical portion 50 is slightly larger than the corresponding outside diameter of screen insert 90. Furthermore, the horizontally extending hollow conical portion 60 is sized larger than the corresponding outside diameter of screen insert 90 such that a gap 91 (FIG. 1) is defined therebetween for allowing circumferential juice flow out of the screen insert 90 as further delineated hereinbelow.

Hollow Feeding Tube 70 and Tamper 76

Additionally, and in one embodiment, the hollow feeding tube 70 is integrally formed with and upwardly extends from the hollow cylindrical portion 50. The hollow feeding tube 70 is in open communication with hollow cylindrical portion 50 via a top opening 56 (FIG. 6) disposed through top of hollow cylindrical portion 50. The upwardly extending hollow feeding tube 70 extends from the top opening 56 in hollow cylindrical portion 50 and terminates to a top flange 72 defining a feed tube opening 74 for feeding the food into the juicer 10. In one embodiment, the diameter of the top flange 72 is larger than the diameter of the remaining portion of the feeding tube 70 and slightly narrower than the open front end 62 of the main body 32.

As shown in FIG. 1, and in one embodiment, a tamper 76 is employed to assist in forcing the foods to the cutters 140 and 340 by pulsing or moving the tamper 76 up and down. In one embodiment, the tamper 76 includes a head 78 surmounting a body 79 wherein the body 79 is sized to be received in the hollow feeding tube 70 and the head 78 is sized larger than the feed tube opening 74 so as not to drop the tamper 76 therethrough.

Abbreviated Hollow Outlet Tube 80

Furthermore, and in one embodiment, the abbreviated or very short hollow outlet tube 80 is integrally formed with the main body 32 and is in open communication therewith via a bottom opening 58 (FIG. 6) disposed through a bottom of main body 32. The abbreviated outlet tube 80 downwardly extends from the bottom opening 58 and terminates to a circular opening or juice outlet 82 for expelling the juice that is extracted from the food.

Screen Insert 90

Referring to FIGS. 2 and 7 through 10, and in one embodiment, screen insert 90 is comprised of an insert member 92 and a screen cone member 134 manufactured as a single, unitary piece by, for example, molding the screen cone member 134 into the insert member 92. Alternatively, the screen insert 90 can be manufactured as separate parts 92 and 134 that are non-removably attached to each other.

Insert Member 92

Figure 7:
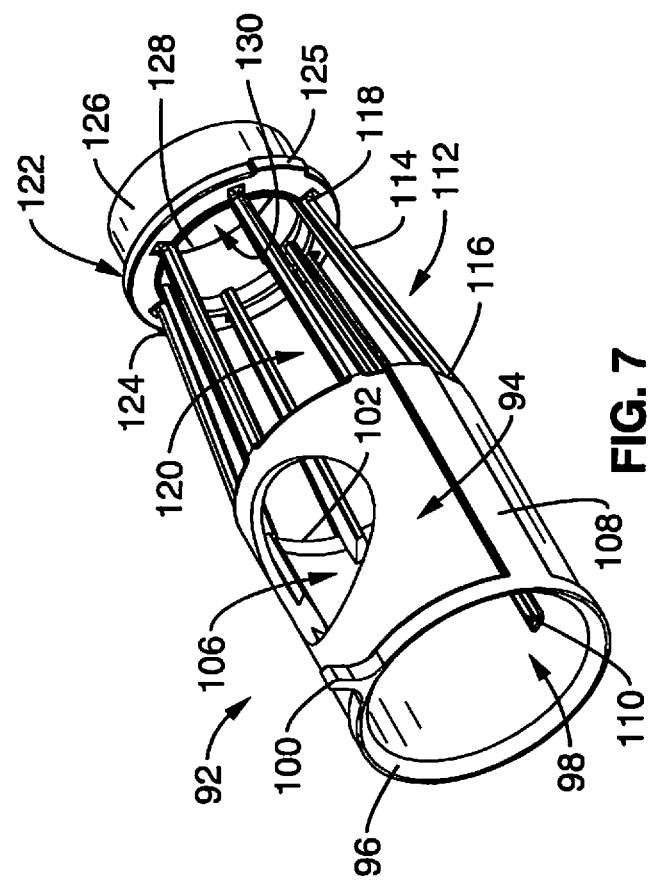
FIG. 7 is a rear and side perspective view of an insert member of a screen insert of the juicer.

Referring to FIGS. 7 through 9, the insert member 92 is comprised of an open ended hollow rear cylindrical section 94 having a rear annular lip 96 defining a rear opening 98 of screen insert 90. The safety projection 100 radially extends from a top section of the rear annular lip 96 and the open ended hollow rear cylindrical section 94 transitions from the rear annular lip 96 to a front annular edge 102 defining a front opening of the rear cylindrical section 94.

An opening 106 is formed through the top of the rear cylindrical section 94 and is in open communication with the upwardly extending hollow feeding tube 70 via the top opening 56 of cylindrical portion 50 when the screen insert 90 properly mates with main body 32. Additionally, the rear cylindrical section 94 includes two exterior longitudinally extending tabs 104, 108 disposed on opposite sides of the rear cylindrical section 94. The two exterior longitudinally extending tabs 104, 108 that correspond to and mate with the two interior diametrically opposed longitudinally extending channels 52, 54 of the hollow cylindrical portion 50. Furthermore, the rear cylindrical section 94 includes three interior spaced apart longitudinally extending ribs 109, 110, and 111 which rearwardly extend from the front annular edge 102 of the rear cylindrical section 94 and terminate prior to reaching the rear opening 98 of the rear cylindrical section 94.

The insert member 92 is further comprised of a front conical section 112 defined by a plurality of spaced apart ribs 114 having rear ends 116 and front ends 118. In one embodiment, there are six spaced apart ribs 114 with every other one of the ribs 114 being continuous with one of the longitudinally extending ribs 109, 110, and 111 disposed within the interior of rear cylindrical section 94. The plurality of spaced apart ribs 114 define windows 120 therebetween and taper forwardly from rear ends 116 to front ends 118.

At front ends 118, the plurality of spaced apart ribs 114 transition into an annular collar 122. The annular collar 122 radially outwardly extends from the front ends 118 of the plurality of spaced apart ribs 114 and includes two diametrically opposed exterior tabs 124, 125 radially extending therefrom for mating with the two diametrically opposed spacings between the two partially circumferential ribs 66, 68 disposed within the interior of the main body 32.

The annular collar 122 forwardly steps down and transitions into a hollow annular rim 126 which extends through the open front end 62 of the main body 32 and terminates to a front circular edge 128 defining a front opening 130 for the expulsion of solids such as pulp, homogenized, or shredded material. Three spaced apart notches 131, 132, and 133 are disposed on an interior surface of the annular rim 126 and rearwardly extend from the front circular edge 128 for receiving three complementarily shaped tabs 187, 188, and 189 disposed on an exterior surface of a restrictor body 172 of greens restrictor 170 further delineated hereinbelow.

Screen Cone Member 134

Referring to FIG. 10, the screen insert 90 further includes the open ended screen cone member 134 which is formed with or fitted into the front conical section 112 of insert member 92 for closing the windows 120 formed by the plurality of spaced apart ribs 114. Additionally, and in one embodiment, the screen cone member 134 is an open ended, screen sided conical cone made of stainless steel. Furthermore, the screen insert 90 can be manufactured in two pieces by, for example, molding the rear cylindrical section 94 as a first piece and the front conical section 112 with the screen cone member 134 as a second piece.

Greens Cutter 140

Referring to FIGS. 2 and 11 through 14, and in one embodiment, the greens juicing configuration 30 is further comprised of the greens cutter 140 which is sized to fit inside screen insert 90 or inside the shredder insert 590. In one embodiment, the greens cutter 140 includes a circular rear base 142 transitioning into an elongated body or member 144 terminating to a tapered nose 146 having a flat tip 148. A blind bore 149 extends through the base forming a circular opening 151 with a flat side 153 and extends through the elongated body 144 up to the nose 146, but not through nose 146 as shown in FIG. 13. The blind bore 149 with flat side 153 are sized and shaped to accommodate motor shaft 24 with flat side 26.

In one embodiment, the greens cutter 140 also includes two projecting helical ribs 150, 152 having opposing back ends which are spaced apart about one hundred eighty degrees apart and which start from circular rear base 142 and terminate to front ends at the flat tip 148 of the nose 146. The greens cutter 140 further includes a cutting portion 154 and an auger portion 162. The cutting portion 154 extends from circular rear base 142 to auger portion 162 and is about one-third the total length of greens cutter 140. Cutting portion 154 includes at least one spiral cutting blade 156 and preferably two spiral cutting blades 156, 158 having opposing first ends which are spaced apart about one hundred eighty degrees apart and which start from circular rear base 142 and which run along the respective projecting helical ribs 150, 152 along the length of the cutting portion 154 and terminate to second ends. Blades 156, 158 are preferably made of stainless steel and can be molded with the respective projecting helical ribs 150, 152 along the cutting portion 154 or can take the place of the helical ribs 150, 152 along the cutting portion 154 and be integrally formed with the elongated body 144 of the greens cutter 140.

The spiral auger portion 162 is formed by the two projecting helical ribs 150, 152 extending from the second ends of the blades 156, 158 up to the flat tip 148 of the tapered nose 146. Spiral auger portion 162 tapers at its front end along tapered nose 146 forming a spiral auger nose which, in one embodiment, is tapered at about a 45 degree angle. Grooves 164 are defined between the two helical ribs 150, 152 and the width of the grooves 164 between the two helical ribs 150, 152 decreases towards tapered nose 146.

Greens Restrictor 170

Referring to FIGS. 2 and 15 through 18, the greens juicing configuration 30 is further comprised of the greens restrictor 170 which includes greens restrictor body 172, wave disc spring 190, and spring retainer 194. Greens restrictor body 172, wave disc spring 190, and spring retainer 194 are preferably provided as a single component, although they may be manufactured either as separate parts that are fused together or as a single unitary piece.

Greens Restrictor Body 172

Referring to FIGS. 15 through 18, greens restrictor body 172 includes a hollow outer cylindrical portion 174 and a forwardly projecting hollow inner tubular portion 180 wherein the hollow outer cylindrical portion 174 is wider in diameter than hollow inner tubular portion 180. Hollow outer cylindrical portion 174 includes an interior conical wall 176 transitioning from a rear opening 178 to the tubular portion 180 which forwardly extends to and terminates at a front opening 182.

At the inside juncture of hollow outer cylindrical portion 174 and tubular portion 180 is inner opening 184, which is about the same size as the flat tip 148 of the tapered nose 146 of the greens cutter 140.

Additionally, the interior conical wall 176 has an angle that corresponds to the angle of the tapered nose 146 of the greens cutter 140.

Furthermore, the interior conical wall 176 includes a plurality of spaced apart ribs 186 which interact with the spiral auger nose defined by the auger portion 156 of greens cutter 140 along tapered nose 146 for providing further food compression and juice extraction.

Moreover, three spaced apart tabs 187, 188, 189 are disposed on the exterior surface of the hollow outer cylindrical portion 174 and are complementarily shaped to be received in the three spaced apart notches 131, 132, and 133 disposed on the interior surface of the annular rim 126 of insert member 92 of screen insert 90.

Wave Disc Spring 190 and Spring Retainer 194

As shown in FIG. 19, the wave disc spring 190 is a circular disc having an alternating generally concave and convex shape or in other words, a disc that is almost flattened but with a wave. The wave disc spring 190 includes a central circular opening 192 sized to be received on hollow tubular portion 180.

As shown in FIGS. 20 and 21, the spring retainer 194 is comprised of a hollow cylindrical tube 196 having an open ended bore 198 extending therethrough and sized to be also received on hollow tubular portion 180 in a fixed position for precluding wave disc spring 190 from inadvertently slipping off hollow tubular portion 180.

Referring to FIGS. 2, 7, 8A, and 15 through 21, greens restrictor 170 attaches to screen insert 90 by sliding into front opening 130 of screen insert 90 such that three spaced apart tabs 187, 188, and 189 on greens restrictor body 172 fit into the three spaced apart notches 131, 132, and 133 disposed on an interior surface of the annular rim 126 of insert member 92 of screen insert 90.

Greens restrictor 170 abuts the wave disc spring 190 between the greens restrictor body 172 and a circular rear face or interior surface 204 of the restrictor nut 200 during juicing as will be further delineated hereinbelow. Hence, the wave disc spring 190 supports greens restrictor 170 against the restrictor nut 200 and allows the greens restrictor 170 to linearly translate back and forth for allowing a large amount of food solids to pass through the greens restrictor 170 while maintaining a constant compression force on the food solids thereby minimizing heat build-up during juicing and homogenizing of greens and other fibrous materials and precluding jamming of the juicer 10.

Restrictor Nut 200

Referring to FIGS. 22 through 24, the restrictor nut 200 is comprised of a cylindrically shaped disk member 202 having a circular rear face 204 and a periphery transitioning into a rearwardly extending annularly shaped sidewall 206 defining a cylindrically shaped pocket 208 with circular rear face 204. The rearwardly extending annularly shaped sidewall terminates to a rear annular edge 210 defining a rear circular opening 212 of the pocket 208. Three spaced apart L-shaped tabs 213, 214, 215 project away from an exterior surface of the annularly shaped sidewall 206 immediately adjacent the rear annular edge 210. A ribbed portion 216 circumscribes the annularly shaped sidewall and the cylindrically shaped disk from a location immediately forward the three spaced apart L-shaped tabs to a front face 218 of the cylindrically shaped disk member 202. Front face 218 transitions into a forwardly extending rectangularly shaped neck portion 220 having two opposing straight sides 222, 224 and two opposing curved sides 226, 228. The neck portion 220 transitions into a thin rectangularly shaped head 230 comprised of a flat front face 231, two opposing straight sides 232, 234, and two opposing curved sides 236, 238 that overhang the neck portion 220 for forming a groove 240. An open ended cylindrical bore 242 extends through the circular rear face 204, the cylindrically shaped disk member 202, the neck portion 220, and the head 230 along a central axis and defines a rear opening 244 and a front opening 246 in the restrictor nut 200. The open ended cylindrical bore 242 is sized to accommodate cylindrical tube 196 of the spring retainer 194 received on hollow tubular portion 180 of the greens restrictor 170 and the cylindrically shaped pocket 208 is sized to receive the hollow outer cylindrical portion 174 of the greens restrictor 170.

Restrictor nut 200 attaches to the front of main body 32 by mating the three spaced apart L-shaped tabs 213, 214, and 215 with the three inwardly projecting tabs 61, 63, and 65 extending from the interior surface of the hollow conical portion 60 of main body 32. Restrictor nut 200 should be attached such that after it is attached, it is oriented with the neck having its two opposing straight sides 222, 224 in a vertical position and its two opposing curved sides 226, 228 in a horizontal position in order to allow deflector 250 to be properly attached to restrictor nut 200. Restrictor nut 200 is used to restrain the linear translation of the greens restrictor 170 and may also be used to facilitate the attachment of a plastic bag to juicer 10 to collect solids expelled out deflector 250.

Deflector 250

Referring to FIGS. 25 and 26, and in one embodiment, the deflector 250 includes a curved top wall 252 transitioning into a semi-circular front wall 254 terminating to a flat bottom periphery 256 defining a semi-circular bottom opening 257. The curved top wall 252 and the semi-circular front wall 254 rearwardly extend to an inverted U-shaped flat back edge 258 defining an inverted U-shaped opening 259 bordered by an inverted U-shaped ridge 260 comprised of a curved top ridge 262 downwardly transitioning to a pair of spaced apart vertical ridges 264 and 266.

The deflector 250 is attached to the restrictor nut 200 by sliding the inverted U-shaped ridge 260 into the groove 240 of the restrictor nut 200 such that the curved top ridge 262 of the deflector 250 engages the curved side 226 of the neck portion 220 and the spaced apart vertical ribs 264, 266 respectively engage the two opposing straight sides 222, 224 of the neck portion 220 for acting as a shield and guiding solid food downward into a container for ease of collection and to minimize the possibility of solids flying out of the juicer during high-speed operations.

Motor Control System 270

Figure 27:
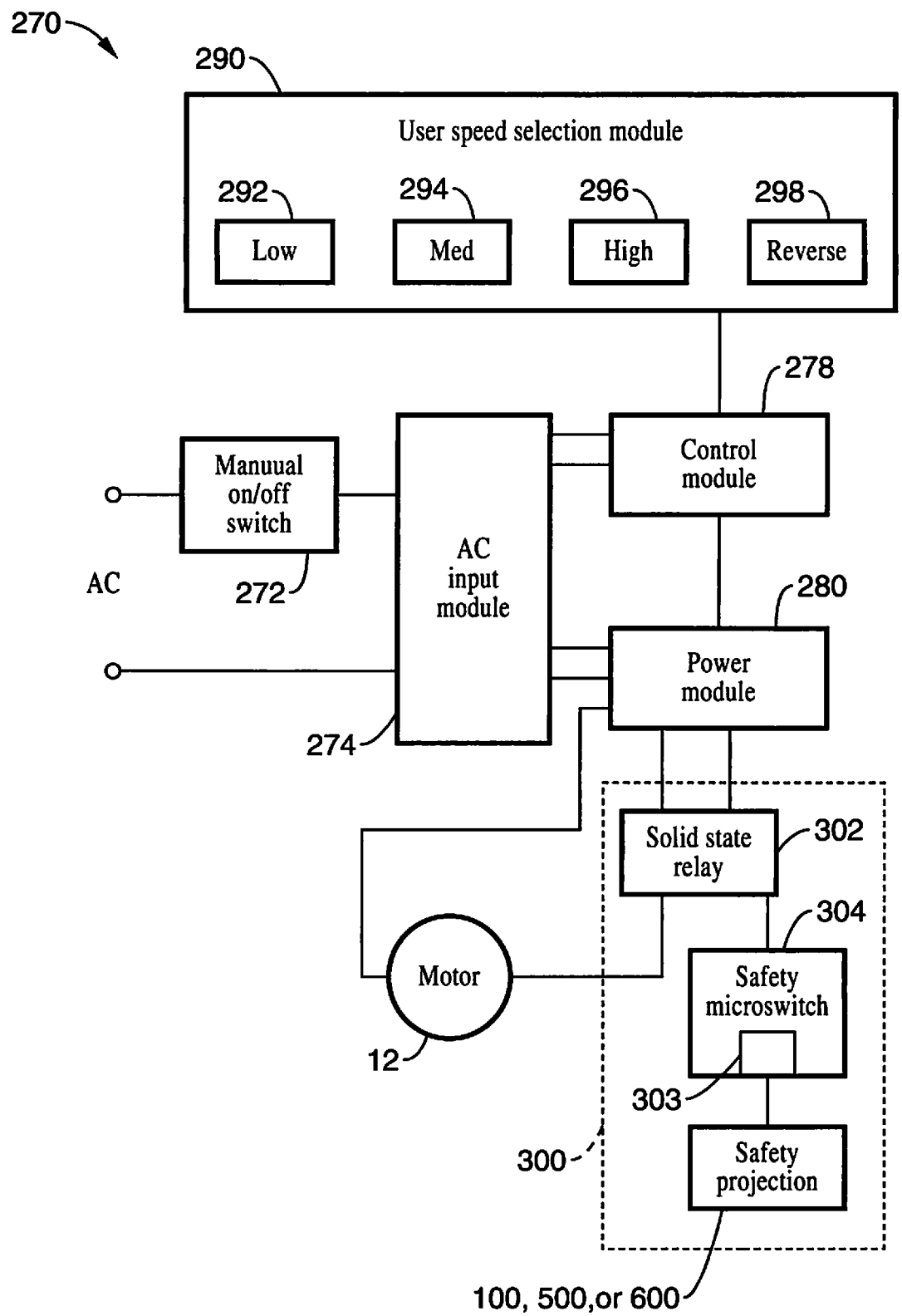
FIG. 27 is a block diagram view of an embodiment of a motor control system including a safety switch system of the juicer.

Referring to FIG. 27, and in one embodiment, the juicer 10 is further comprised of a motor control system 270 comprised of a manual on/off switch 272, an AC input module 274, a control module 278, a power module 280, a user speed selection module 290, and a safety switch system 300 operatively coupled to motor 12.

In one embodiment, the manual on/off switch 272 is coupled in series between the AC input module 274 which is coupled to an AC power source for allowing the AC input module 274 to receive power from the power source when the manual on/off switch 272 is in the on position and for interrupting power from the AC power source to the AC input module 274 when the manual on/off switch 272 is in the off position. The AC input module 274 is operatively coupled to both the control module 278 and the power module 280 for providing voltage and current requirements for the respective modules 278, 280. The control module 278 is operatively coupled to the power module 280 and user speed selection module 290. The power module 280 is connected to the motor 12 wherein the control module 278 controls the motor speed through the power module 280 in response to a user selected speed set by means of the user speed selection module 290 which typically develops digital signals as a function of the status of a rotary type switch, a slide type switch, a lever toggle type switch, or a pushbutton switch.

In one embodiment, the user speed selection module 290 is provided with a low speed selection switch or pushbutton 292 which corresponds to a motor speed of about 300 rpm to about 350 rpm, a medium speed selection switch or pushbutton 294 which corresponds to a motor speed of about 600 rpm to about 1000 rpm, and a high speed selection switch or pushbutton 296 which corresponds to a motor speed of about 1200 rpm to about 1725 rpm. Additionally, the user speed selection module 290 can include a reverse selection switch or pushbutton 298 to reverse the motor 12. Furthermore, the user speed selection module 290 can incorporate the manual on/off switch 272.

Alternatively, and for single speed operation, the user speed selection module 280 can be eliminated and the control module 278 designed for a single set speed.

The AC input module 274, the control module 278, the power module 280, and the user speed selection module 290 can be designed from discreet components and/or integrated circuits as is evident to those having ordinary skill in the art, informed by the present disclosure.

Additionally, motor 12 may be any suitable motor, such as, a universal motor, an induction motor, a brush type DC motor, a brushless DC motor, or the like which is capable of driving the cutters 140 or 340 for greens juicing, vegetable juicing, homogenizing, shredding, and/or other user creative purposes.

The inventor has found that a motor of approximately ⅓ horsepower works well.

Safety Switch System 300

Referring to FIGS. 1 and 27, the motor control system 270 is further comprised of safety switch system or means 300 comprised of a solid state relay 302 operatively coupled between the power module 280 and the motor 12; the safety microswitch 304 operatively coupled to the solid state relay 302 and including microswitch push button 303; and at least one of the safety projections 100, 500, and 600 formed with respective inserts 90, 490, and 590 for coacting with the push button 303 of the safety microswitch 304.

In one embodiment, the microswitch 304 is mounted on an inside surface of the hub 20 and the microswitch push button 303 projects through an opening in hub 20 and into the indentation 48 of the rear annular flange 40 when insert 90, 490, or 590 is absent thereby precluding the juicer from being operated. When insert 90, 490, or 590 is properly attached, the safety projection 100 on the screen insert 90, the safety projection 500 on the homogenizing insert 490, or the safety projection 600 on the shredder insert 590 is received in the indentation 48 disposed in the rear annular flange 40 of the main body 32 and causes the microswitch push button 303 to be depressed thereby activating the solid state relay 302 to send current to the motor 12 via the power module 280 for energizing the juicer 10.

More specifically, when the manual switch 272 is in the on position, a voltage will be provided to the solid state relay 302. However, current will not flow through the solid state relay 302 and the motor 12 will not be energized until the main body 32 with the insert 90, 490, or 590 is received therein both are connected to the hub 20 such that the projection 100, 500, or 600 addresses the microswitch push button 303 of the microswitch 304.

Thus, if the main body 32 is attached to hub 22 without one of the inserts in place, then safety microswitch 304 does not allow motor 12 to operate. Hence, even with the manual switch 272 in the on position, the juicer 10 requires the actuation of safety microswitch 304 by one of the projections on the inserts for allowing power to be transmitted to the motor in a safe manner.

Use and Operation of Greens Juicing Configuration 30

To use and operate juicer 10 in greens juicing configuration 30, the user first assembles the components shown in FIG. 2 to the motor shaft 24 and hub 20 shown in FIG. 1. Now referring to FIGS. 1 through 27, the assembly is accomplished by sliding the greens cutter 140 onto motor shaft 24 and then inserting the screen insert 90 through the open back end 42 of the main body 32 with the projection 100 on the screen insert 90 received within the indentation 48 of the annular flange 40. Next, the main body 32, with the screen insert 90 inserted therein, is placed over the greens cutter 140 and connected to the hub 22 by lining up the cut-out notches 44 on the annular flange 40 with the corresponding in turned ears 24 on the hub 20 and then linearly translating the main body 32 with screen insert 90 therein towards the hub 20 and finally turning the main body 32 and screen insert 90 counterclockwise for allowing the annular flange 40 to slide under the in turned ears 24 until the radially extending stop 46 comes in contact with the uppermost in turned ear of the plurality of in turned ears 24 for providing a locking connection. The greens restrictor 170 with greens restrictor body 172, wave disc spring 190, and spring retainer 194 is slid into the front opening 130 of the screen insert 90 as delineated above. Restrictor nut 200 is attached to front of main body 32 via tabs 213, 214, and 215 by a counterclockwise rotation. Deflector 250, which is optional, is slid into groove 240 between neck 220 and head 230 of restrictor nut 200. A container is placed below juice outlet 82 to collect the juice and another container is placed below deflector 250 to collect the expelled solids which are typically discarded.

Once assembled, a speed is selected via user speed selection module 290 and the juicer 10 is turned on via manual on/off switch 272. Typically, and in one embodiment, a low speed is selected for the greens juicing configuration 30. Next, food is placed into the feeding tube 70 via feed tube opening 74 and tamper 76 is employed to assist in forcing the food to the cutter 40 by pulsing or moving the tamper 76 up and down. The food passes through opening 106 in screen insert 90 makes contact with cutting portion 154 of greens cutter 140. The rotating blades 156, 158 function both as a cutter and an auger; they cut the food and push it forward along the length of cutting portion 154 to auger portion 156. The cut food is squeezed or compressed between ribs 109, 110, 111, and 114 of screen insert 90 and greens cutter 140 to extract the juice. The juice is circumferentially forced out screen cone member 134 by way of windows 120 and circulates around the outside of screen insert 90. Furthermore, the plurality of spaced apart ribs 186 disposed on the interior conical wall 176 of the restrictor body 172 interact with the auger portion 156 along tapered nose 146 for providing further food compression and juice extraction. The action of gravity causes the extracted juice to collect into at the bottom surfaces of the hollow cylindrical portion 50 and the hollow conical portion 60 which taper or funnel toward the downwardly extending abbreviated hollow outlet tube 80 to promote juice flow out of juice outlet 82 into the container below. The solid material does not pass out screen cone 36, but is forced forward through greens restrictor 170 and out restrictor nut 200 where it is downwardly deflected by deflector 250 into a container below.

Disassembly of the greens juicing configuration 30 can be accomplished by reversing the above assembly steps.

Vegetable Juicing Configuration 330

Figure 28:
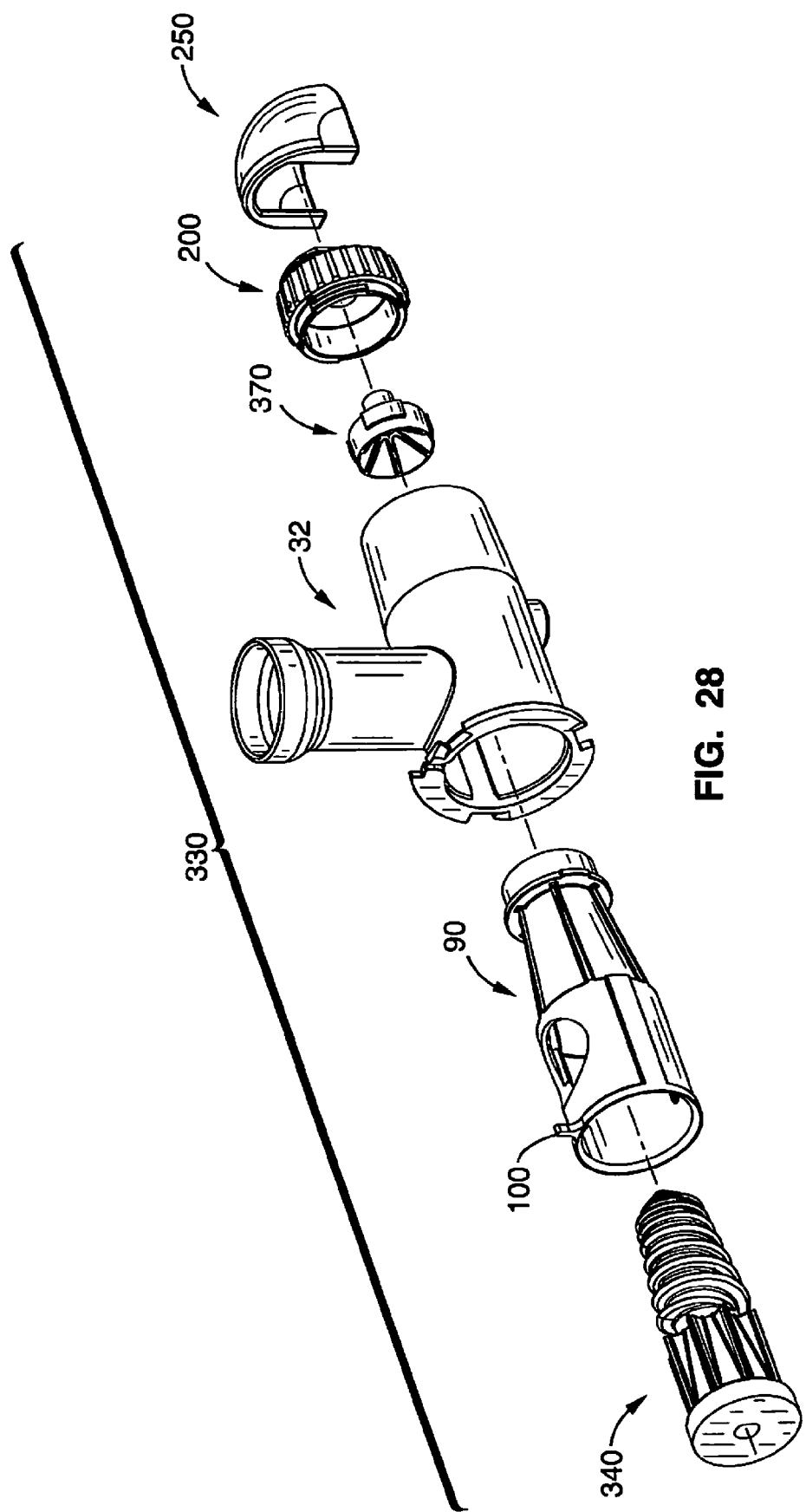
FIG. 28 is an exploded parts perspective view of a vegetable juicing configuration.

FIG. 28 shows an exploded parts perspective view of the vegetable juicing configuration 330 of the juicer 10 for preferably juicing hard vegetables, such as carrots or beets. Vegetable juicing configuration 330 is comprised of the grinding cutter 340, the screen insert 90, the main body 32, a vegetable restrictor 370, the restrictor nut 200, and the optional deflector 250.

Screen insert 90, main body 32, restrictor nut 200, and optional deflector 250 are as described above.

Grinding Cutter 340

As shown in FIGS. 29 through 31, the grinding cutter 340 is comprised of rear base 342 transitioning into an elongated body or member having a cutting portion 344 and a spiral auger portion 350. The cutting portion 344 comprised of a plurality of straight, substantially parallel saw toothed cutting blades 346 longitudinally extending along cutting portion 344 and circumferentially spaced apart from one another forming grooves 348 therebetween. The grooves 348 slope downwardly from the base 342 along the length of the cutting portion 344 to promote food flow. Cutting portion 344 has, in one embodiment, a length of about one-third the total length of grinding cutter 340 and includes about eight blades 346, although a greater or lesser number of blades 346 may be used. Blades 346 are preferably made of stainless steel and may be molded separately from or integrally with cutter 340.

The grinding cutter 340 further includes the spiral auger portion 350 forwardly transitioning from the cutting portion 344 and running along a tapered front nose 352 having a blunt, flattened tip 354. The taper of the spiral auger portion 350 along front nose 352 forms a spiral auger nose which, in one embodiment, is tapered at about a 45 degree angle. The spiral auger portion 350 is formed by two projecting helical ribs 356, 358 which start at opposing first ends which are spaced apart about one hundred eighty degrees and which are immediately adjacent the cutting portion 344 and which continue along up to the blunt, flattened tip 354 where they terminate to seconds ends. The two projecting helical ribs 356, 358 form grooves 360 therebetween and the width of the grooves 360 between the two helical ribs 356, 358 decreases just prior to and along tapered front nose 352.

A blind bore 362 extends through the base 342 forming a circular opening 364 with a flat side 366 and continues through the cutting portion 344 and partially through the auger portion 350 up to the nose 352, but not through nose 352. The blind bore 362 and flat side 366 are sized and shaped to accommodate motor shaft 24 and flat side 26.

Grinding cutter 340 is sized to fit inside screen insert 90, homogenizing insert 490, or shredder insert 590.

Vegetable Restrictor 370

As shown in FIGS. 32 and 33, vegetable restrictor 370 is similar to greens restrictor body 172 and is used during juicing of less fibrous materials than wheatgrass, when heat build-up is not a concern, to increase juice extraction.

Vegetable restrictor 370 includes a hollow outer cylindrical portion 374 and a forwardly projecting hollow inner tubular portion 380 wherein the hollow outer cylindrical portion 374 is wider in diameter than hollow inner tubular portion 380. Hollow outer cylindrical portion 374 includes an interior conical wall 376 transitioning from a rear opening 378 to the tubular portion 380 which forwardly extends to and terminates at a front opening 382. At the inside juncture of hollow outer cylindrical portion 374 and tubular portion 380 is inner opening 384, which is about the same size as the flat tip 354 of the tapered nose 352 of the grinding cutter 340.

Additionally, the interior conical wall 376 has an angle that corresponds to the angle of the tapered nose 352 of the grinding cutter 340. Furthermore, the interior conical wall 376 includes a plurality of spaced apart ribs 386 which interact with the auger portion 350 along tapered nose 352 of the grinding cutter 340 for providing further food compression and thus, juice extraction. Moreover, three spaced apart tabs 387, 388, and 389 are disposed on the exterior surface of the hollow outer cylindrical portion 374 and are complementarily shaped to be received in the three spaced apart notches 131, 132, and 133 disposed on the interior surface of the annular rim 126 of insert member 92 of screen insert 90.

Use and Operation of Vegetable Juicing Configuration 330

The use and operation of juicer 10 in the vegetable juicing configuration 330 is similar to the use and operation of the greens juicing configuration 30 with the exception of using the grinding cutter 340 instead of the greens cutter 140 and using the vegetable restrictor 370 instead of the greens restrictor 170. Hence, the user first assembles the components shown in FIG. 28 to the motor shaft 24 and hub 20 shown in FIG. 1 in a similar fashion described hereinabove for the greens juicing configuration 30.

Once assembled, the juicer 10 is turned on via manual on/off switch 272 and a speed is selected via user speed selection module 290. Typically, and in one embodiment, a high speed is selected of about 1725 rpm for juicing hard vegetables. Next, food is placed into the feeding tube 70 via feed tube opening 74 and tamper 76 is employed to assist in forcing the food to the grinding cutter 340 by pulsing or moving the tamper 76 up and down. The food passes through opening 106 in screen insert 90 makes contact with cutting portion 344 of grinding cutter 340 wherein the food is cut and pushed forward to auger portion 350. The cut food is squeezed between ribs 109, 110, 111, and 114 of screen insert 90 and grinding cutter 340 to extract the juice. The juice is circumferentially forced out screen cone member 134 by way of windows 120 and circulates around the outside of screen insert 90. Furthermore, the plurality of spaced apart ribs 386 disposed on the interior conical wall 376 of the vegetable restrictor 370 interact with the auger portion 350 along tapered nose 352 for providing further food compression and juice extraction. The action of gravity causes the extracted juice to collect into at the bottom surfaces of the hollow cylindrical portion 50 and the hollow conical portion 60 which taper or funnel toward the downwardly extending abbreviated hollow outlet tube 80 to promote juice flow out of juice outlet 82 into a container below. The solid material does not pass out screen cone 36, but is forced forward through vegetable restrictor 370 and out restrictor nut 200 where it is downwardly deflected by deflector 250 into a container below.

Disassembly of the vegetable juicing configuration 330 can be accomplished by reversing the assembly steps.

Homogenizing Configuration 430

Figure 34:
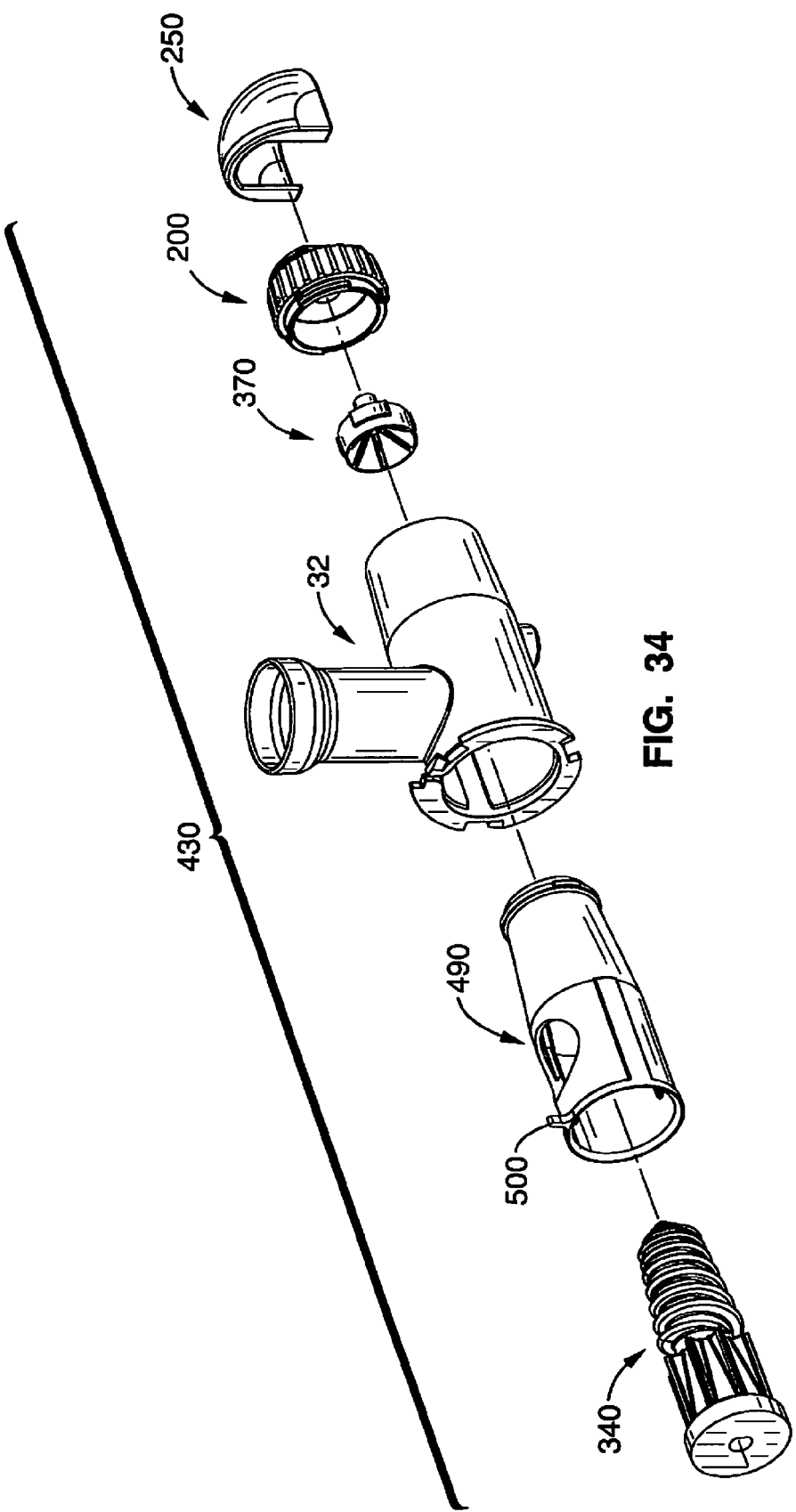
FIG. 34 is an exploded parts perspective view of a homogenizing configuration of the juicer.

FIG. 34 shows an exploded parts perspective view of the homogenizing configuration 430 of the juicer 10 for preferably preparing foods such as baby food, sauces, sorbets, nut butters, and purees. The homogenizing configuration 430 includes grinding cutter 340, homogenizing insert 490, main body 32, vegetable restrictor 370 or greens restrictor 170, restrictor nut 200, and optional deflector 250.

Grinding cutter 340, main body 32, vegetable restrictor 370, greens restrictor 170, restrictor nut 200, and optional deflector 250 are as described above.

Homogenizing Insert 490

As shown in FIGS. 34 through 36, homogenizing insert 490 is identical to screen insert 90 with the exception that homogenizing insert 490 does not have screen cone 134 or windows 120 of the front conical section 112 of the screen insert 90, but instead has a open ended closed sided front conical section 512.

More specifically, and referring to FIGS. 34, 35, 36A, and 36B, the homogenizing insert 490 is comprised of an open ended hollow rear cylindrical section 494 having a rear annular lip 496 defining a rear opening 498 of homogenizing insert 490. The safety projection 500 radially extends from a top section of the rear annular lip 496 and the open ended hollow rear cylindrical section 494 transitions from the rear annular lip 496 to a front annular edge 502 defining a front opening of the rear cylindrical section 494.

An opening 506 is formed through the top of the rear cylindrical section 494 and is in open communication with the upwardly extending hollow feeding tube 70 via the top opening 56 of cylindrical portion 50 when the homogenizing insert 490 properly mates with main body 32. Additionally, the rear cylindrical section 494 includes two exterior longitudinally extending tabs 504, 508 disposed on opposite sides of the rear cylindrical section 494. The two exterior longitudinally extending tabs 504, 508 correspond to and mate with the two interior diametrically opposed longitudinally extending channels 52, 54 of the hollow cylindrical portion 50 of main body 32. Furthermore, the rear cylindrical section 494 includes three interior spaced apart longitudinally extending ribs 509, 510, and 511 which rearwardly extend from the front opening defined by the front annular edge 502 of the rear cylindrical section 494 and terminate prior to reaching the rear opening 498 of the rear cylindrical section 494.

The homogenizing insert 490 is further comprised of an open ended closed sided front conical section 512 that is integrally formed with and transitions forwardly from the front annular edge 502 of the rear cylindrical section 494 and terminates to an annular collar 522. The open ended closed sided front conical section 512 includes a plurality of interior, spaced apart ribs 514. In one embodiment, there are six spaced apart ribs 514 with every other one of the ribs 514 being continuous with one of the longitudinally extending ribs 509, 510, and 511 disposed within the interior of rear cylindrical section 494. The plurality of spaced apart ribs 514 extend the length of the open ended closed sided front conical section 512. In another embodiment, the homogenizing insert 490 can be formed as two pieces comprised of the rear cylindrical section 494 and the open ended closed sided front conical section 512.

The annular collar 522 radially outwardly extends from the front conical section 512 and includes two diametrically opposed exterior tabs 521, 523 radially extending therefrom for mating with the two diametrically opposed spacings between the two partially circumferential ribs 66, 68 disposed within the interior of the main body 32.

The annular collar 522 forwardly steps down and transitions into to a hollow annular rim 524 which extends through the open front end 62 of the main body 32 and terminates to a front circular edge 525 defining a front opening 526 for the expulsion of solids. Three spaced apart notches 527, 528, and 529 are disposed on an interior surface of the annular rim 524 and rearwardly extend from the front circular edge 525 for receiving three complementarily shaped tabs 387, 388, and 389 disposed on the exterior surface of vegetable restrictor 370.

In homogenizing configuration 430, the homogenizing insert 490 functions to force all of the food out the front opening 526 and thus, out the front of juicer 10, and out deflector 250, with no juice coming out juice outlet 82. Additionally, either vegetable restrictor 370 or greens restrictor 170 may be used in the homogenizing configuration 43. The choice depends on the material to be homogenized and the desired consistency of the puree. In most cases, vegetable restrictor 370 is preferable. Vegetable restrictor 370 and greens restrictor 170 attach to homogenizing insert 490 in the same way that they attach to screen insert 90 as described above.

Use and Operation of Homogenizing Configuration 430

The use and operation of juicer 10 in the homogenizing configuration 430 is similar to the use and operation of the greens juicing configuration 30 with the exception of using the grinding cutter 340 in place of the greens cutter 140, using the homogenizing insert 490 in place of the greens insert 90, and using the vegetable restrictor 370 in place of the greens restrictor 170 although, the greens restrictor 170 may be used as noted above. Additionally, the homogenizing configuration 430 is similar to the use and operation of the vegetable juicing configuration 330 with the exception of using the homogenizing insert 490 in place of the greens insert 90.

Hence, the user first assembles the components shown in FIG. 34 to the motor shaft 24 and hub 20 shown in FIG. 1 in a similar fashion described hereinabove for the greens juicing configuration 30.

Once assembled, a speed is selected via user speed selection module 290 and the juicer 10 is turned on via manual on/off switch 272. Typically, and in one embodiment, a high speed is selected for the homogenizing configuration 430. Next, food is placed into the feeding tube 70 via feed tube opening 74 and tamper 76 is employed to assist in forcing the food to the grinding cutter 340 by pulsing or moving the tamper 76 up and down. The food passes through opening 506 in homogenizing insert 490 and makes contact with cutting portion 344 of grinding cutter 340 wherein the food is cut and pushed forward to auger portion 350. The cut food is squeezed or compressed between ribs 509, 510, 511, and 514 of homogenizing insert 490 and grinding cutter 340 to process the cut food into a uniform mixture. The uniform mixture or homogenized food is forced forward through vegetable restrictor 370 and out restrictor nut 200 where it is downwardly deflected by deflector 250 into a container below.

Disassembly of the homogenizing configuration 430 can be accomplished by reversing the assembly steps.

Shredder Configuration 530

Figure 37:
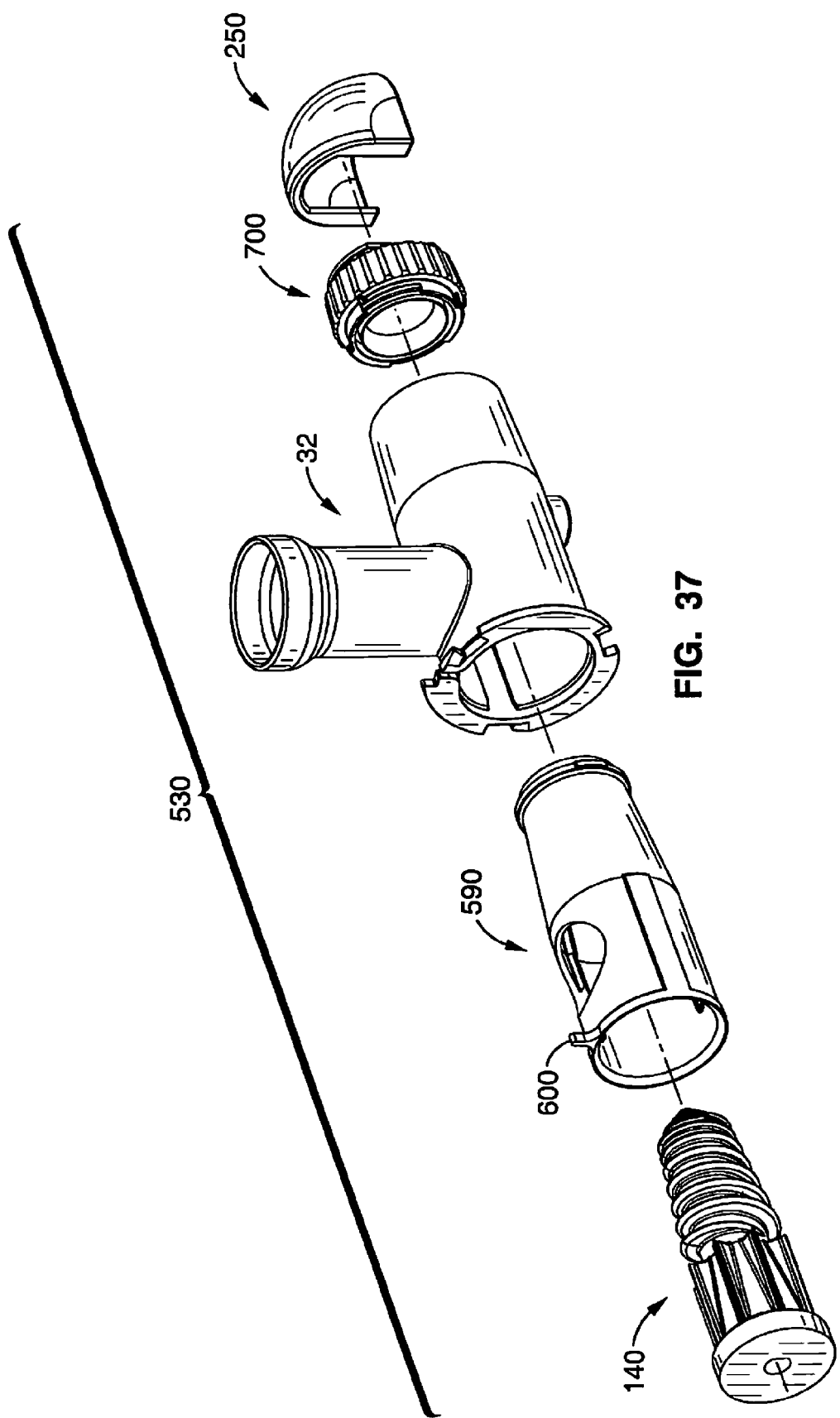
FIG. 37 is an exploded parts perspective view of a shredder configuration of the juicer.

FIG. 37 shows an exploded parts perspective view of the shredder configuration 530 of the juicer 10 for preferably shredding hard or soft vegetables such as for salads, coleslaw, and cakes or muffins, such that no juice is produced. The shredder configuration 530 includes greens cutter 140, shredder insert 590, main body 32, shredder nut 700, and optional deflector 250. Alternatively, instead of greens cutter 140, grinding cutter 340 may be used to achieve a more finely ground material.

Greens cutter 140, grinding cutter 340, main body 32, and deflector 250 are as described above.

Shredder Insert 590

Figure 38:
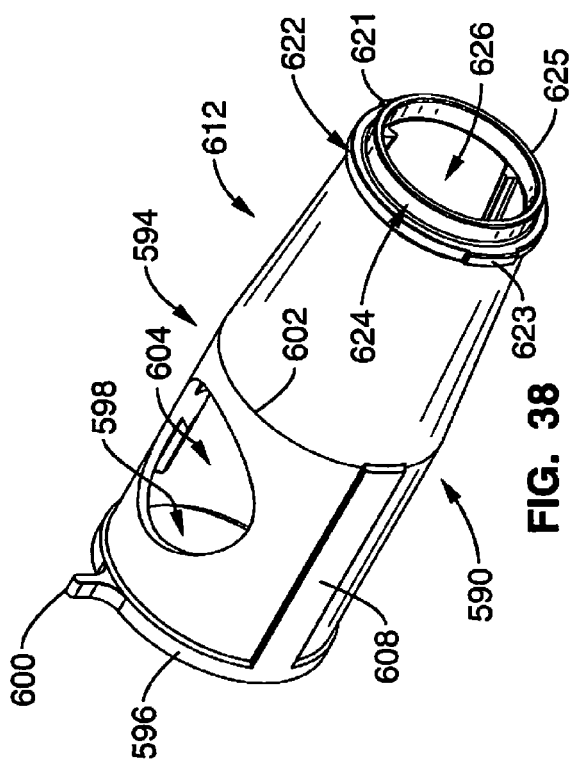
FIG. 38 is a side and front perspective view of a shredder insert of the juicer.
Figure 42:
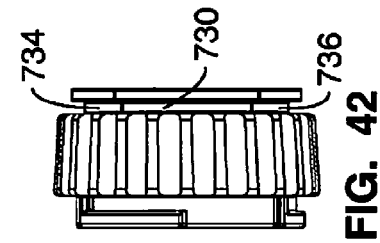
FIG. 42 is a plan side view of the shredder nut of the juicer.
Figure 41:
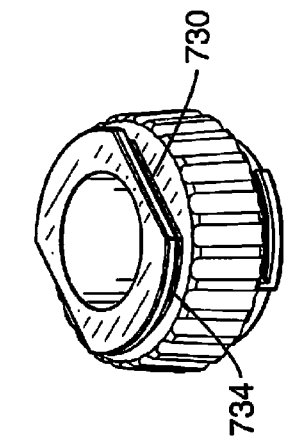
FIG. 41 is another side and front perspective view of the shredder nut of the juicer.
Figure 40:
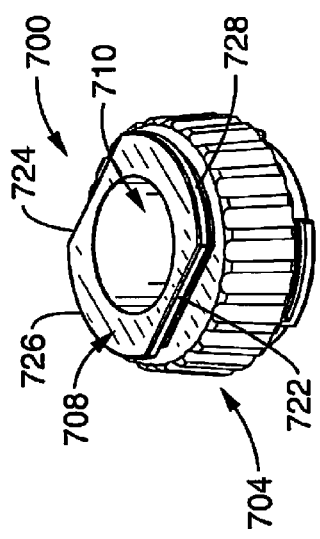
FIG. 40 is a side and front perspective view of a shredder nut of the juicer.
Figure 44:
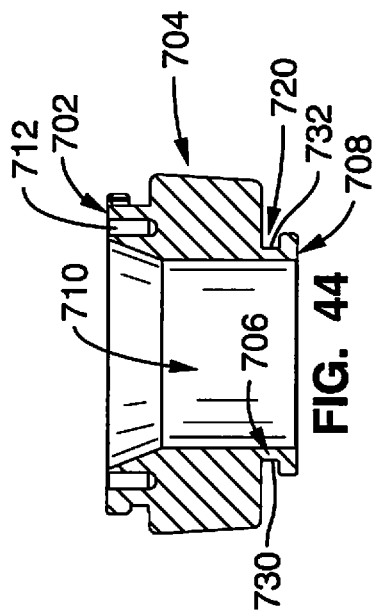
FIG. 44 is a sectional view of the shredder nut taken along line 44-44 of FIG. 43.
Figure 43:
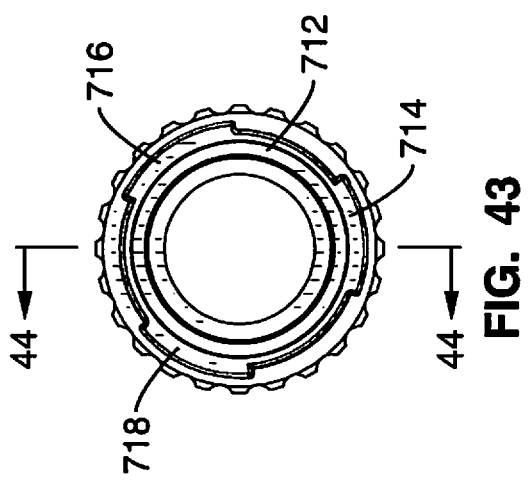
FIG. 43 is a back plan view of the shredder nut of the juicer.

As shown in FIG. 38, shredder insert 590 is similar to homogenizing insert 490, but it is slightly shorter than both homogenizing insert 490 and main body 32.

Figure 39:
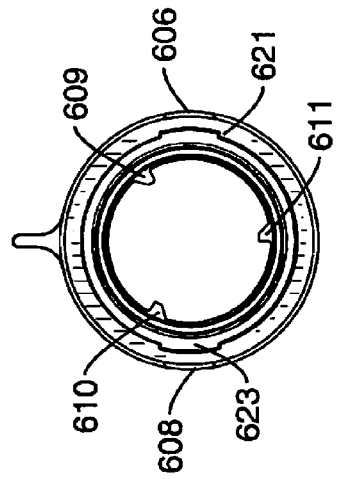
FIG. 39 is a front plan view of the shredder insert of the juicer.

More specifically, and referring to FIGS. 37 through 39, the shredder insert 590 is comprised of an open ended hollow rear cylindrical section 594 having a rear annular lip 596 defining a rear opening 598 of shredder insert 590. The safety projection 600 radially extends from a top section of the rear annular lip 596 and the open ended hollow rear cylindrical section 594 transitions from the rear annular lip 596 to a front annular edge 602 defining a front opening of the rear cylindrical section 594.

An opening 604 is formed through the top of the rear cylindrical section 594 and is in open communication with the upwardly extending hollow feeding tube 70 via the top opening 56 of cylindrical portion 50 when the shredder insert 590 properly mates with main body 32. Additionally, the rear cylindrical section 594 includes two exterior longitudinally extending tabs 606, 608 disposed on opposite sides of the rear cylindrical section 594. The two exterior longitudinally extending tabs 606, 608 correspond to and mate with the two interior diametrically opposed longitudinally extending channels 52, 54 of the hollow cylindrical portion 50 of main body 32.

The shredder insert 590 is further comprised of an open ended closed sided front conical section 612 that is integrally formed with and transitions forwardly from the front annular edge 602 of the rear cylindrical section 594 and terminates to an annular collar 622. The open ended closed sided front conical section 612 and the rear cylindrical section 594 includes a plurality of interior, spaced apart ribs 609, 610, and 611 which longitudinally extend from the annular collar 622 and terminate prior to reaching the rear opening 598 of the rear cylindrical section 594.

The annular collar 622 radially outwardly extends from the front conical section 612 and includes two diametrically opposed exterior tabs 621, 623 radially extending therefrom for mating with the two diametrically opposed spacings between the two partially circumferential ribs 66, 68 disposed within the interior of the main body 32.

The annular collar 622 forwardly steps down and transitions into to a hollow annular rim 624 which terminates to a front circular edge 625 defining a front opening 626 for the expulsion of solids.

In shredder configuration 530, the shredder insert 590 functions to force all of the food out front opening 626 and thus, out the front of juicer 10, and out deflector 250, with no juice coming out juice outlet 82. Hence, shredder insert 590 facilitates the expulsion of chopped food while minimizing compression and juice extraction.

In another embodiment, the shredder insert 590 can be formed as two pieces comprised of the open ended hollow rear cylindrical section 594 and the open ended closed sided front conical section 612.

Shredder Nut 700

As shown in FIGS. 40 through 44, shredder nut 700 is similar to restrictor nut 200. Shredder nut 700 includes a back face 702, an externally ribbed cylindrical body 704, a neck portion 706, a front face 708, and an open ended bore 710 extending through back face 702, cylindrical body 704, neck portion 706, and front face 708.

The back face 702 is provided with an annular groove 712 sized to accommodate the annular rim 624 of the shredder insert 590. Shredder nut 700 also includes three L-shaped tabs 714, 716, 718 projecting outward from an exterior side of the back face 702.

The front face 708 is spaced from the cylindrical body 704 by the neck portion 706 and the front face 708 overhangs the neck portion 706 thereby forming a groove 720 therebetween. Front face 708 is rectangularly shaped and includes two opposing straight sides 722, 724 and two opposing curved sides 726, 728. Additionally, the neck portion 706 is rectangularly shaped and includes two opposing straight sides 730, 732 and two opposing curved sides 734, 736 wherein the sides defines the shape of the bottom of the groove 720.

Shredder nut 700 attaches to the front of main body 32 by mating the three spaced apart L-shaped tabs 714, 716, 718 with the three inwardly projecting tabs 61, 63, and 65 extending from the interior surface of the hollow conical portion 60 of main body 32. Shredder nut 700 should be attached such that after it is attached, it is oriented with the neck having its two opposing straight sides 730, 732 in a vertical position and its two opposing curved sides 734, 736 in a horizontal position in order to allow deflector 250 to be properly attached to Shredder nut 700 in the same way that it attaches to restrictor nut 200 as described above. Shredder nut 700 is used to channel shredded food through the shredder insert 590 while minimizing compression and juice extraction. Deflector 250 attaches to shredder nut 700 in the same way that it attaches to restrictor nut 200 as described above.

Use and Operation of Shredder Configuration 530

The use and operation of juicer 10 in the shredder configuration 530 is similar to the use and operation of the greens juicing configuration 30 with the exception of using the shredder insert 590 in place of the greens insert 90, eliminating the greens restrictor 170, and using the shredder nut 700 in place of the restrictor nut 200.

Hence, the user first assembles the components shown in FIG. 37 to the motor shaft 24 and hub 20 shown in FIG. 1 in a similar fashion described hereinabove for the greens juicing configuration 30. Thus, greens cutter 140 or grinding cutter 340 is slid onto motor shaft 24. Body 32 with shredder insert 590 is assembled over cutter 140 or 340 and coupled to hub 20, shredder nut 700 is coupled to front of body 32, and deflector 250 is coupled to shredder nut 700 all as further delineated hereinabove. A container is placed below deflector 250 to collect the solid material.

Once assembled, a speed is selected via user speed selection module 290 and the juicer 10 is turned on via manual on/off switch 272. Typically, and in one embodiment, a medium or high speed is selected for the shredder configuration 530. Next, food is placed into the feeding tube 70 via feed tube opening 74 and tamper 76 is employed to assist in forcing the food to the greens cutter 140 or grinding cutter 340 by pulsing or moving the tamper 76 up and down. The food passes through opening 604 in shredder insert 590 and makes contact with cutting portion 154 of greens cutter 140 or with cutting portion 344 of grinding cutter 340 wherein the food is cut and pushed forward to auger portion 156 or 350. The coaction of the ribs 609, 610, and 611 of shredder insert 590 with the greens cutter 140 or grinding cutter 340 promote the shredding process. The shredded food is forced forward through shredder nut 700 where it is downwardly deflected by deflector 250 into the container below.

Disassembly of the shredder configuration 530 can be accomplished by reversing the assembly steps.

In one aspect, the components of the juicer 10 can be made of nylon for light use, stainless steel for heavy use, or a combination of nylon and stainless steel.

Accordingly, it should be apparent that further numerous structural modifications and adaptations may be resorted to without departing from the scope and fair meaning of the present invention as set forth hereinabove and as described herein below by the claims.

I claim:

1. A juicer device, comprising:
a housing;
a motor substantially horizontally disposed within said housing and having an output shaft substantially horizontally projecting away from said housing;
at least two alternate cutters each individually detachably connectable to said output shaft and each having a rear base, wherein at least one of said at least two alternate cutters is defined as a grinding cutter;
a plurality of alternate inserts each having a passage extending therethrough, said passage having an open back end and an open front end and a top feed through opening between said open back end and said open front end wherein a selected one of said plurality of alternate inserts circumscribes a selected one of said at least two alternate cutters detachably connected to said output shaft by said passage being shaped to receive said selected one of said at least two alternate cutters within said selected one of said plurality of alternate inserts through said open back end of said passage and wherein said rear base of said selected one of said at least two alternate cutters is disposed within said passage of said selected one of said plurality of alternate inserts;
a body operatively coupled to said housing and having an hollow extending therethrough, said hollow having an entrance end and an exit end wherein said selected one of said plurality of alternate inserts and said body concentrically circumscribe said selected one of said at least two alternate cutters detachably connected to said output shaft by said hollow being shaped to receive said selected one of said plurality of alternate inserts within said body through said entrance end of said hollow; and means for actuating said motor for rotating a selected one of said at least two alternate cutters detachably connected to said output shaft at one of a plurality of different selectable speeds.

2. The device of claim 1 wherein said grinding cutter comprises an elongated body terminating to a tapered nose having a blunt, flattened tip, said elongated body having a rearward cutting portion transitioning into a forward auger portion.

3. The device of claim 2 wherein said rearward cutting portion comprises substantially parallel saw toothed cutting blades longitudinally extending along said rearward cutting portion and circumferentially spaced apart from one another forming grooves therebetween.

4. The device of claim 3 wherein said grooves of said rearward cutting portion slope downwardly from said rear base along the length of said rearward cutting portion.

5. The device of claim 2 wherein said forward auger portion comprises at least one helical rib and at least one helical groove extending from said rearward cutting portion to said blunt, flattened tip.

6. A juicer device, comprising:
a housing;
a motor substantially horizontally disposed within said housing and having an output shaft substantially horizontally projecting away from said housing;
at least two alternate cutters each individually detachably connectable to said output shaft and each having a rear base, wherein at least one of said at least two alternate cutters is defined as a grinding cutter;
a plurality of alternate inserts each having a passage extending therethrough, said passage having an open back end and an open front end and a top feed through opening between said open back end and said open front end wherein a selected one of said plurality of alternate inserts circumscribes a selected one of said at least two alternate cutters detachably connected to said output shaft by said passage being shaped to receive said selected one of said at least two alternate cutters within said selected one of said plurality of alternate inserts through said open back end of said passage and wherein said rear base of said selected one of said at least two alternate cutters is disposed within said passage of said selected one of said plurality of alternate inserts; and
a body operatively coupled to said housing and having an hollow extending therethrough, said hollow having an entrance end and an exit end wherein said selected one of said plurality of alternate inserts and said body concentrically circumscribe said selected one of said at least two alternate cutters detachably connected to said output shaft by said hollow being shaped to receive said selected one of said plurality of alternate inserts within said body through said entrance end of said hollow.

7. The device of claim 6 wherein said grinding cutter comprises an elongated body terminating to a tapered nose having a blunt, flattened tip, said elongated body having a rearward cutting portion transitioning into a forward auger portion.

8. The device of claim 7 wherein said rearward cutting portion comprises substantially parallel saw toothed cutting blades longitudinally extending along said rearward cutting portion and circumferentially spaced apart from one another forming grooves therebetween.

9. The device of claim 8 wherein said grooves of said rearward cutting portion slope downwardly from said rear base along the length of said rearward cutting portion.

10. The device of claim 7 wherein said forward auger portion comprises at least one helical rib and at least one helical groove extending from said rearward cutting portion to said blunt, flattened tip.

* * * * *